US012627544B2

(12) United States Patent
Wang

(10) Patent No.: US 12,627,544 B2
(45) Date of Patent: May 12, 2026

(54) METHOD AND DEVICE FOR DETECTING STARTING POINT OF SIGNAL, STORAGE MEDIUM AND ELECTRONIC DEVICE

(71) Applicants: GUANGZHOU SHIYUAN ELECTRONIC TECHNOLOGY COMPANY LIMITED, Guangzhou (CN); GUANGZHOU SHIYUAN ARTIFICIAL INTELLIGENCE RESEARCH INSTITUTE LIMITED COMPANY, Guangzhou (CN)

(72) Inventor: Fei Wang, Guangzhou (CN)

(73) Assignees: GUANGZHOU SHIYUAN ELECTRONIC TECHNOLOGY COMPANY LIMITED, Guangzhou (CN); GUANGZHOU SHIYUAN ARTIFICIAL INTELLIGENCE RESEARCH INSTITUTE LIMITED COMPANY, Guangzhou (CN)

( * ) Notice: Subject to any disclaimer, the term of this patent is extended or adjusted under 35 U.S.C. 154(b) by 0 days.

(21) Appl. No.: 18/833,978

(22) PCT Filed: May 9, 2022

(86) PCT No.: PCT/CN2022/091683
§ 371 (c)(1),
(2) Date: Jul. 29, 2024

(87) PCT Pub. No.: WO2023/216058
PCT Pub. Date: Nov. 16, 2023

(65) Prior Publication Data
US 2025/0126002 A1 Apr. 17, 2025

(51) Int. Cl.
H04L 27/06 (2006.01)
H04L 1/1829 (2023.01)
H04L 25/02 (2006.01)

(52) U.S. Cl.
CPC ............ H04L 27/06 (2013.01); H04L 1/1832 (2013.01); H04L 25/0202 (2013.01)

(58) Field of Classification Search
CPC ... H04L 27/06; H04L 1/1832; H04L 25/0202; G01S 7/2921; H03M 1/1245; H03M 1/12; G06F 3/03; G06F 3/038
See application file for complete search history.

(56) References Cited

U.S. PATENT DOCUMENTS 6,144,413 A     11/2000 Zatsman
10,034,145 B2 *  7/2018 Yang ....................... H04W 4/48
(Continued)

FOREIGN PATENT DOCUMENTS

CN      105373214 A     3/2016
WO     2021219851 A1   11/2021

OTHER PUBLICATIONS

International Search report received for PCT Patent Application No. PCT/CN2022/091683, mailed on Jan. 17, 2023.
(Continued)

*Primary Examiner* — Chieh M Fan
(74) *Attorney, Agent, or Firm* — Zhong Law, LLC

(57) ABSTRACT

The present disclosure discloses a method and device for detecting a starting point of a signal, a storage medium and an electronic device. Therein, the method includes: receiving a sensing signal collected by a sensor; after segmenting the sensing signal into at least one segment signal, calculating a segment energy value of each segment signal, and acquiring a signal band containing a starting point of a signal of a pulse signal based on each segment energy value; based on a measured energy value at each sampling point in the signal band, calculating an instantaneous energy value at each sampling point in the signal band by using a sliding window method; acquiring a first energy ratio between a first sampling point and a second sampling point in the signal (Continued)

Receiving a sensing signal collected by a sensor; after segmenting the sensing signal into at least one segment signal, calculating a segment energy value of each segment signal; and acquiring a signal band containing a starting point of a signal of a pulse signal based on each segment energy value — S101

Based on a measured energy value of each sampling point in the signal band, calculating an instantaneous energy value of each sampling point in the signal band by using a sliding window method — S102

Acquiring a first energy ratio between a first sampling point and a second sampling point in the signal band, wherein the second sampling point is a previous sampling point of the first sampling point — S103 if the first energy ratio is greater than an initial-ratio threshold value, confirming a sampling time corresponding to the first sampling point as the starting point of a signal — S104 band; and if the first energy ratio is greater than an initial-ratio threshold value, determining a sampling time corresponding to the first sampling point as the starting point of the signal. According to the present disclosure, the instantaneous energy value is calculated by using the sliding window method, and a signal starting point where an energy value is sharply increased is found by means of an energy ratio, thereby the accuracy of detecting starting point of the signal is improved, and thus the accuracy of signal feature analysis is improved.

19 Claims, 6 Drawing Sheets

(56)                    References Cited

U.S. PATENT DOCUMENTS

| | | | |
|---|---|---|---|
| 11,133,023 B1 | 9/2021 | Hedgecock | |
| 2009/0117916 A1* | 5/2009 | Jo ...................... | H04W 56/005 |
| | | | 455/456.1 |

OTHER PUBLICATIONS

Written Opinion of the International Search Authority received for PCT Patent Application No. PCT/CN2022/091683, mailed on Jan. 17, 2023.

* cited by examiner

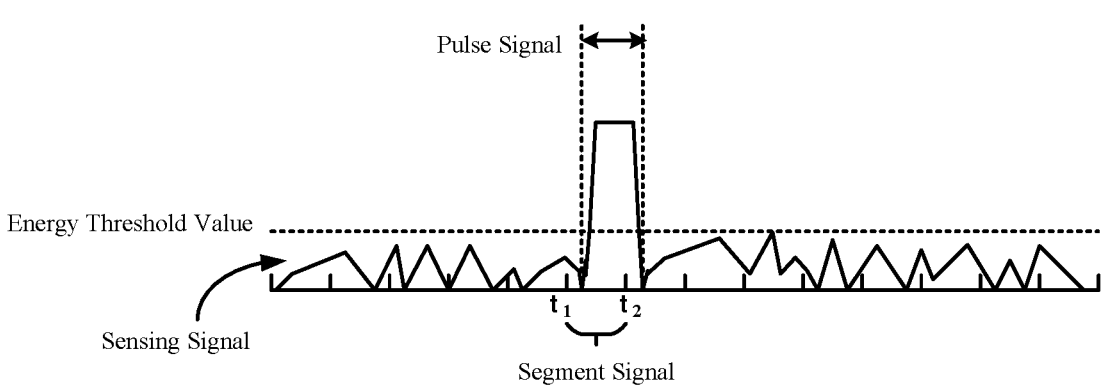

Fig. 1

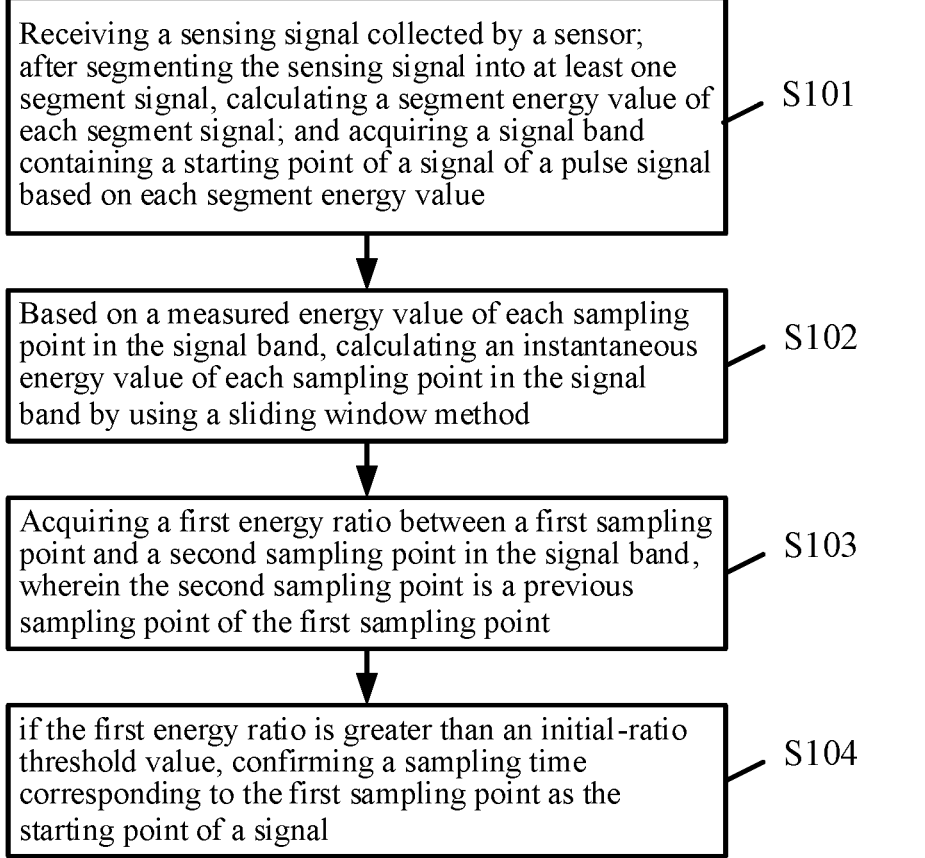

Receiving a sensing signal collected by a sensor; after segmenting the sensing signal into at least one segment signal, calculating a segment energy value of each segment signal; and acquiring a signal band containing a starting point of a signal of a pulse signal based on each segment energy value

S101

Based on a measured energy value of each sampling point in the signal band, calculating an instantaneous energy value of each sampling point in the signal band by using a sliding window method

S102

Acquiring a first energy ratio between a first sampling point and a second sampling point in the signal band, wherein the second sampling point is a previous sampling point of the first sampling point

S103 if the first energy ratio is greater than an initial-ratio threshold value, confirming a sampling time corresponding to the first sampling point as the starting point of a signal

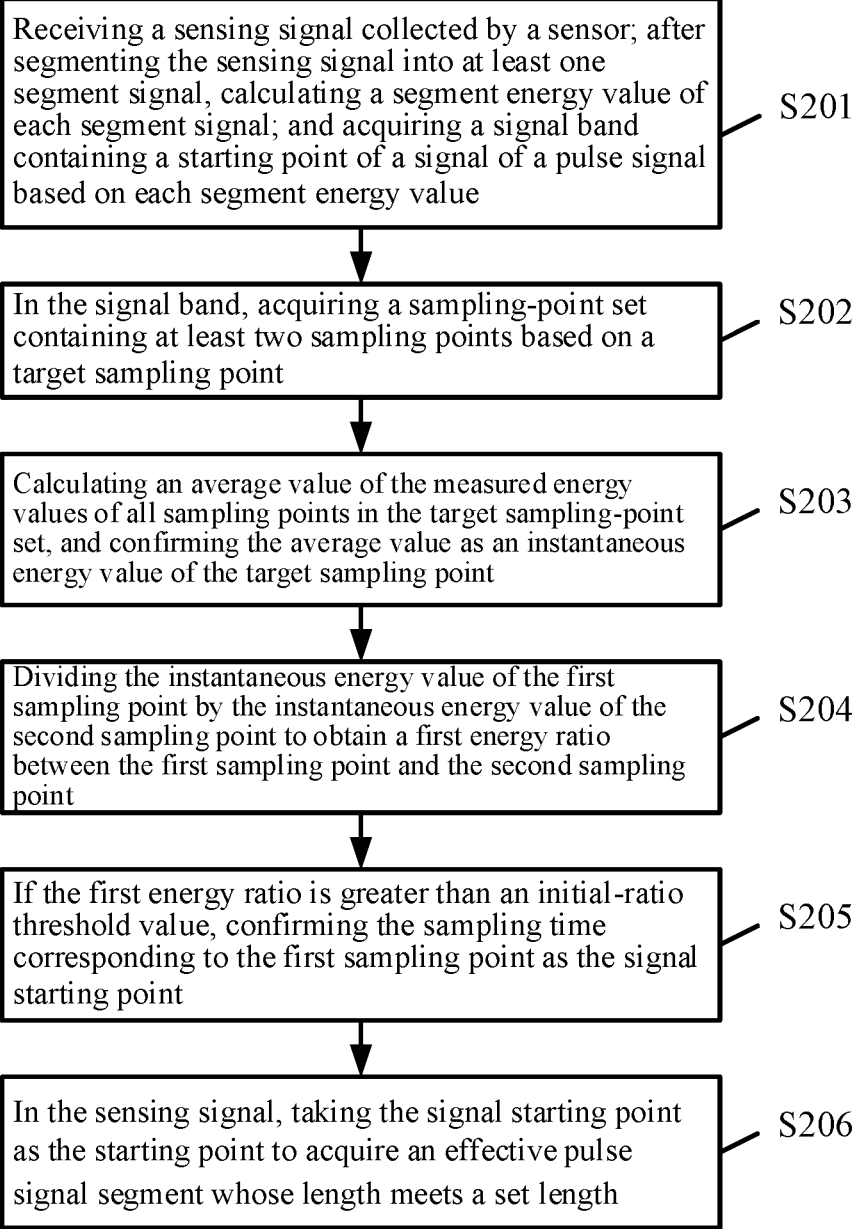

Receiving a sensing signal collected by a sensor; after segmenting the sensing signal into at least one segment signal, calculating a segment energy value of each segment signal; and acquiring a signal band containing a starting point of a signal of a pulse signal based on each segment energy value — S201

In the signal band, acquiring a sampling-point set containing at least two sampling points based on a target sampling point — S202

Calculating an average value of the measured energy values of all sampling points in the target sampling-point set, and confirming the average value as an instantaneous energy value of the target sampling point — S203

Dividing the instantaneous energy value of the first sampling point by the instantaneous energy value of the second sampling point to obtain a first energy ratio between the first sampling point and the second sampling point — S204

If the first energy ratio is greater than an initial-ratio threshold value, confirming the sampling time corresponding to the first sampling point as the signal starting point — S205

In the sensing signal, taking the signal starting point as the starting point to acquire an effective pulse signal segment whose length meets a set length — S206

Fig. 3

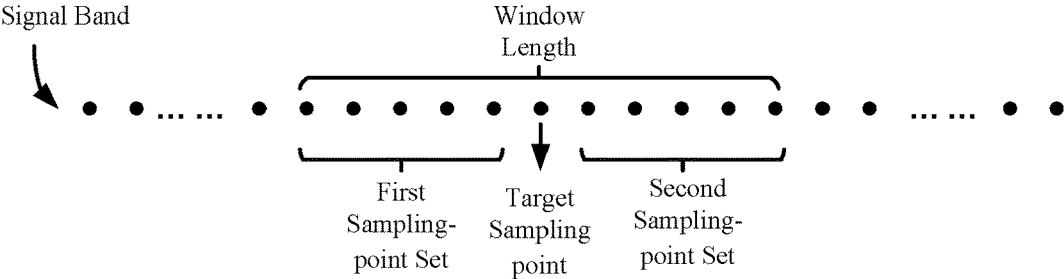
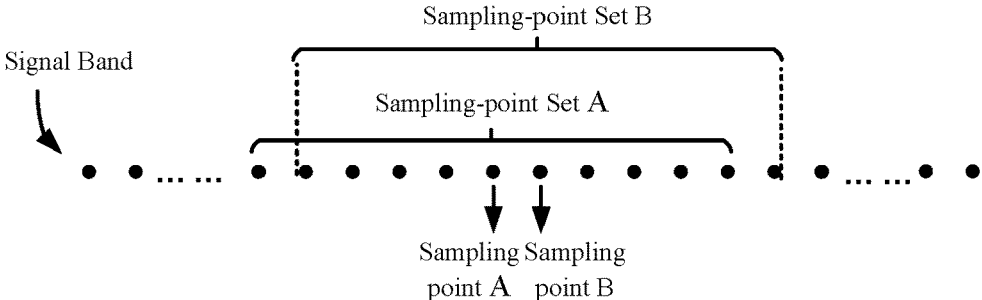
Fig. 5
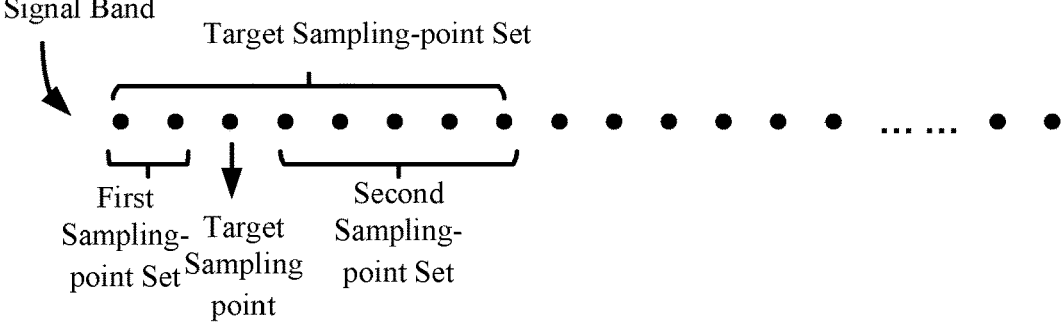
Fig. 6
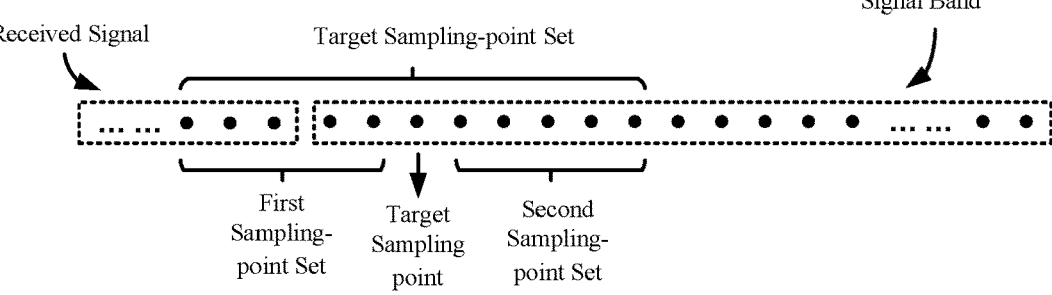
Fig. 7

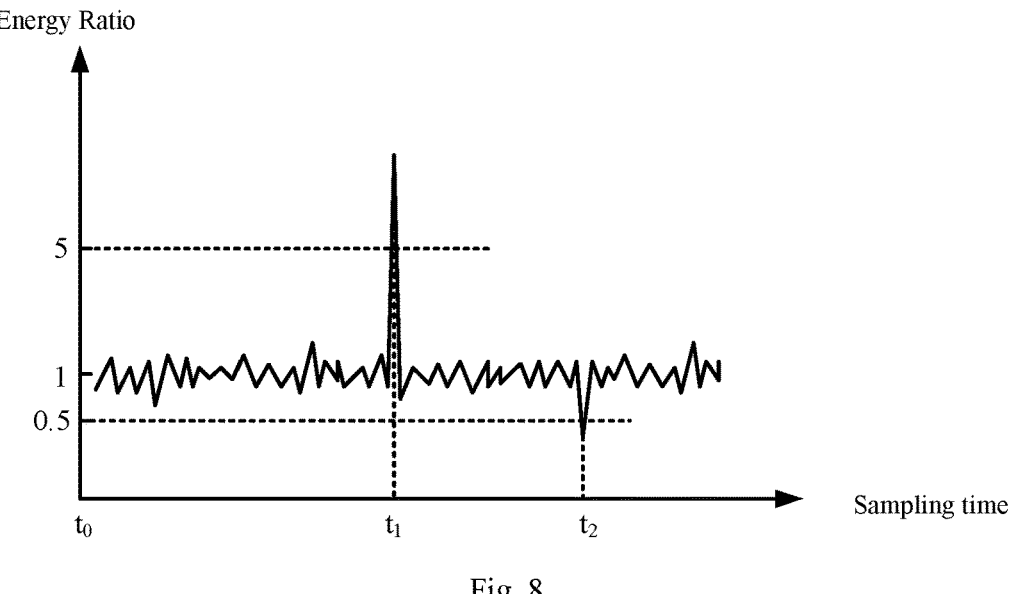
Fig. 8
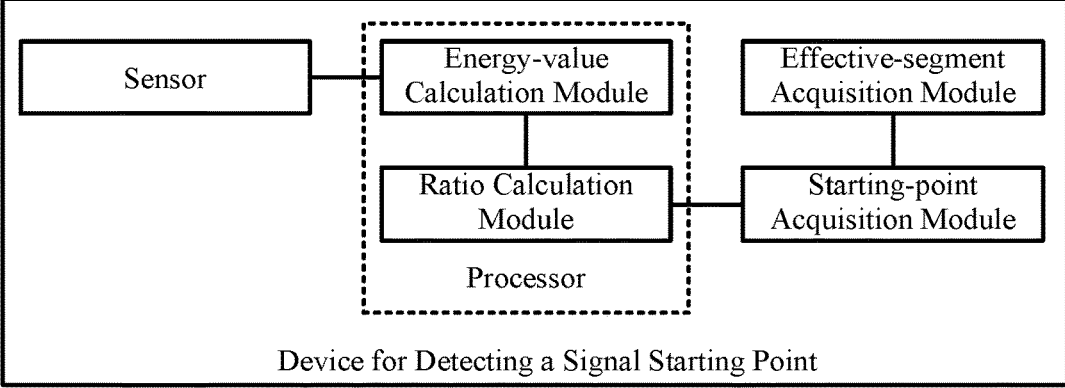
Fig. 9
Fig. 10

METHOD AND DEVICE FOR DETECTING STARTING POINT OF SIGNAL, STORAGE MEDIUM AND ELECTRONIC DEVICE

CROSS-REFERENCE TO RELATED APPLICATIONS

This application is the U.S. National Phase under 35. U.S.C. § 371 of International Application PCT/CN2022/091683, filed May 9, 2022. The disclosure of the above-mentioned application is hereby incorporated by reference in its entirety.

TECHNICAL FIELD

The present disclosure relates to the field of computer technology, in particular to a method and device for detecting a starting point of a signal, a storage medium and an electronic device.

BACKGROUND

Acquiring the starting point of the pulse signal can help acquire an accurate and effective pulse signal segment, which is helpful for signal feature analysis and information extraction, etc. The current approaches search the received signal to find the signal segment in which the starting point of the pulse signal is located. The current implemented approaches can only determine an approximate range of the starting point of a signal. The position of the starting point of a signal is overly unclear, which affects the accuracy of determination of the starting point of a signal, leading to impacts on the accuracy and efficiency of the signal feature analysis.

SUMMARY

An embodiment of the present disclosure provides a method and device for detecting starting point of a signal, a storage medium and an electronic device, which can calculate an instantaneous energy value by a sliding window method, and use an energy ratio to find the starting point of a signal with a sharp increase in energy value, thereby improving the accuracy of detecting starting point of a signal, and further improving the accuracy of signal feature analysis. The technical solution is as follows.

In a first aspect, an embodiment of the present disclosure provides a method for detecting a starting point of a signal, the method includes:

receiving a sensing signal collected by a sensor;

responsive to segmenting the sensing signal into at least one segment signal, calculating a segment energy value for each of the at least one segment signal, and acquiring a signal band containing a starting point of a signal of a pulse signal based on each segment energy value of each segment signal;

based on a measured energy value at each sampling point in the signal band, calculating an instantaneous energy value at each sampling point in the signal band by using a sliding window method;

acquiring a first energy ratio between a first sampling point and a second sampling point in the signal band, wherein the second sampling point is a prior sampling point of the first sampling point; and if the first energy ratio is greater than an initial-ratio threshold value, determining a sampling time corresponding to the first sampling point as the starting point of a signal.

In a second aspect, an embodiment of the present disclosure provides a device for detecting a starting point of a signal, the device includes a sensor, a processor and a starting-point acquisition module; wherein one end of the processor is connected with the sensor, and the other end of the processor is connected with the starting-point acquisition module;

the sensor acquires a sensing signal and sends the sensing signal to the processor;

the processor divides the sensing signal into at least one segment signal, calculates a segment energy value for each of the at least one segment signal, and acquires a signal band containing a starting point of a signal of a pulse signal based on each segment energy value;

the processor calculates an instantaneous energy value at each sampling point in the signal band by the sliding window method based on a measured energy value at each sampling point in the signal band;

the processor acquires a first energy ratio between a first sampling point and a second sampling point in the signal band, and the processor sends the first energy ratio to the starting-point acquisition module, wherein the second sampling point is a prior sampling point of the first sampling point;

if the first energy ratio is greater than an initial-ratio threshold value, the starting-point acquisition module determines a sampling time corresponding to the first sampling point as the starting point of a signal.

In a third aspect, an embodiment of the present disclosure provides a computer storage medium, the computer storage medium stores a plurality of instructions, wherein the instructions are suitable to be loaded by the processor to perform the above method steps.

In a fourth aspect, an embodiment of the present disclosure provides an electronic device, and the electronic device may include a processor and a memory; wherein the memory stores a computer program, and the computer program is suitable to be loaded by the processor to perform the above method steps.

BRIEF DESCRIPTION OF THE DRAWINGS

In order to more clearly describe technical solutions in embodiments of the present disclosure or the present technology, the following will briefly introduce the drawings needed in the description of the embodiments or the present technology. It is obvious that the drawings in the following description are only some embodiments of the present disclosure. For those skilled in the art, other drawings can be obtained from these drawings without creative work.

FIG. 1 is a diagram of an example of acquiring a starting point of a signal provided by an embodiment of the present disclosure.

FIG. 2 is a flow diagram of a method for detecting a starting point of a signal provided by an embodiment of the present disclosure.

FIG. 3 is a flow diagram of a method for detecting a starting point of a signal provided by an embodiment of the present disclosure.

FIG. 5 is a diagram of an example of acquiring an instantaneous energy value provided by an embodiment of the present disclosure.

FIG. 6 is a diagram of an example of acquiring a sampling-point set provided by an embodiment of the present disclosure.

FIG. 7 is a diagram of an example of acquiring a sampling-point set provided by an embodiment of the present disclosure.

FIG. 8 is a diagram of an example of an energy ratio curve provided by an embodiment of the present disclosure.

FIG. 9 is a structural diagram of a device for detecting a starting point of a signal provided by an embodiment of the present disclosure.

FIG. 10 is a structural diagram of a device for detecting a starting point of a signal provided by an embodiment of the present disclosure.

DESCRIPTION OF THE PREFERRED EMBODIMENTS

Figure 4:
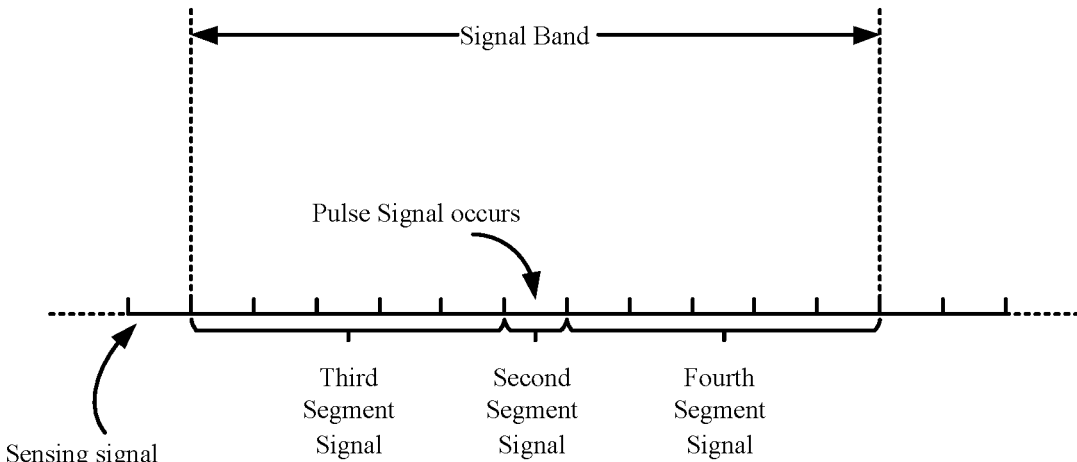
FIG. 4 is a diagram of an example of acquiring a signal band provided by an embodiment of the present disclosure.

Hereinafter, the technical solution in embodiments of the present disclosure will be described clearly and completely in combination with the attached drawings in the embodiments of the present disclosure. It is evident that the described embodiments are only a part of the embodiments of the present disclosure. Based on the embodiments in the present disclosure, all other embodiments obtained by those skilled in the art without creative work fall within the scope of protection in the present disclosure.

The methods for detecting a starting point of a signal provided by the embodiment of the present disclosure can be implemented using computer program and can be run on a device for detecting a starting point of a signal based on Von Neumann system. The computer program can be integrated into an application or run as an independent tool application. The device for detecting a starting point of a signal can acquire a sensing signal through a sensor, where the sensor can convert a received information into the sensing signal in a form of electrical signal through analog-to-digital conversion (ADC). It can be understood that the received information can be amplified after ADC to obtain the sensing signal. That is, the sensing signal mentioned in the embodiments of the present disclosure may be a digital signal obtained after pre-processing such as ADC of the original signal collected by the sensor. The device for detecting the starting point of a signal may include a sensor, and the device for detecting the starting point of a signal may directly adopt the included sensor to acquire the sensing signal. If the device for detecting the starting point of a signal does not include sensors, the device for detecting the starting point of a signal may receive the sensing signal acquired by other sensors. It can be understood that the amplitude of the sensing signal detected by the sensor can be converted into an energy value of the sensing signal.

The methods for detecting the starting point of a signal provided by the embodiments of the present disclosure can be applied to an interactive tablet, which can be an integrated device that controls contents displayed on a display screen and realizes human-computer interactive operation through touch technology, and integrates one or more functions such as projector, electronic whiteboard, screen, audio, television and video conference terminal. The interactive tablet includes at least one operation panel. In addition, the interactive tablet further includes a processing apparatus, a touch sensor and a vibration sensor, and the vibration sensor and touch sensor are connected to the processing apparatus by communication. The processing apparatus is configured to implement the methods for detecting the starting point of a signal provided by the embodiments of the present disclosure. The sensing signal collected by the vibration sensor is a detection object of the methods for detecting the starting point of a signal provided by the embodiments of the present disclosure. The operation panel may be a glass panel covering the display screen of the interactive tablet. Optionally, the interactive tablet can be a smart blackboard. The smart blackboard includes a regular blackboard and a display screen. The underneath of the operation panel may be provided with no display screen, but a traditional common blackboard. The underneath of the operation panel may also be a display screen.

The vibration sensor provided in this solution is arranged on the operation panel to detect a vibration acoustic signal generated when an object touches the operation panel of the interactive tablet. For example, a piezoelectric vibration sensor is installed at the frame of the operation panel or inside the cover plate. When the object touches the operation panel, it will generate a vibration acoustic signal with characteristics. The vibration acoustic signal starts from the contact point along the operating panel, either spreading outward or inward towards the inner side of the operating panel. The piezoelectric vibration sensor located at the frame of the operation panel or inside the cover plate can convert a raw vibration acoustic signal into a voltage signal, and transmit a voltage signal to an IC chip with a temperature compensation circuit for amplification processing, and convert it into a digital vibration acoustic signal through the ADC circuit. The digital vibration acoustic signal is the sensing signal to be processed by the methods for detecting the starting point of a signal provided by the embodiments of the present disclosure. In addition, capacitive vibration sensors can be used. In this implementation approach, the capacitive vibration sensor located at the frame of the operation panel or inside the cover plate can convert the original vibration acoustic signal into an electrical signal (reflected herein as the change in capacitance), and send the electrical signal to the IC chip with a temperature compensation circuit for amplification, and convert it into a digital vibration acoustic signal through the ADC circuit.

The vibration sensor is specifically installed at a position where the vibration of the operation panel can be transmitted, but not necessarily at a position where the vibration occurs. For example, vibration sensors may be arranged at the four corners of the operation panel. Obviously, there can also be other arrangement methods, for example, a vibration sensor may be arranged at the midpoint of each side of the rectangular frame of the operation panel. The number of sensors can vary such as having two or five sensors. If the vibration sensors can detect the vibration when an object contacts with the operation panel during the touch operation, the specific number of the vibration sensors arranged can be set according to the size and detection accuracy of the operation panel. In general, the larger the size of the operation panel, the higher the detection accuracy requirements, and the more vibration sensors are arranged. The vibration sensor can be directly installed on the surface of the operation panel, such as the upper surface or the lower surface of the operation panel, so as to receive the vibration transmitted by the operation panel and improve the accuracy of touch detection. The vibration sensor may also be installed in the frame of the operation panel, so as to reduce the impacts on the internal mechanism, and reduce common-mode noise interference from the operation panel meanwhile. Obviously, the vibration sensor may also be installed on other parts in contact with the operation panel, so as to receive the vibration occurring in the operation panel through the transmission of other parts.

Sources of generating vibration acoustic signals include various elements that generate noise (such as motors, speakers, fans, etc.) in the interactive tablet and apparatus that generate noise (such as indoor air conditioners, televisions, etc.) outside the interactive tablet. These elements will cause the vibration sensor to detect various noise signals in the process of use, that is, they cause the vibration acoustic signals collected by the vibration sensor to include noise signals. Therefore, the following is very important: how to accurately locate a starting point of vibration acoustic signal from a signal containing noise signal, so as to extract the vibration acoustic signal generated when the object touches the operation panel of the interactive tablet.

Referring to FIG. 1, FIG. 1 is a diagram of an example of acquiring a starting point of a signal provided by an embodiment of the present disclosure. It can be understood that the sensing signal of the sensor can further include pulse signal in addition to noise signal, so the sensing signal still has a certain amount of energy in the period when there is no pulse signal, and when there is a pulse signal, the energy value of the sensing signal will suddenly increase. Therefore, the device for detecting the starting point of a signal can set an energy threshold value. If the energy value of the sensing signal is greater than the energy threshold value, it indicates that there is a pulse signal in the sensing signal. The energy threshold value is a threshold value used to determine whether there is a pulse signal in the sensing signal. The device for detecting the starting point of a signal may segment the sensing signal into at least one segment signal of an equal duration. As shown in FIG. 1, the sensing signal between a time point $t_1$ and a time point $t_2$ is a segment signal. The energy value of the sensing signal before the time point $t_1$ has not been greater than the energy threshold value, which indicates that there is no pulse signal before the time point $t_1$, and although the sensing signal has energy value, it should be caused by noise signals. However, the energy value of the sensing signal between the time point $t_1$ and the time point $t_2$ exceeds the energy threshold value, which indicates that the pulse signal occurs between the time point $t_1$ and the time point $t_2$, so the device for detecting the starting point of a signal can determine that there is a starting point of a signal of the pulse signal in the segment signal between the time point $t_1$ and the time point $t_2$.

The method for detecting the starting point of a signal provided by the present disclosure will be described in detail in combination with specific embodiments.

Referring to FIG. 2, FIG. 2 is a flow diagram of a method for detecting a starting point of a signal provided by an embodiment of the present disclosure. As shown in FIG. 2, the method described in the embodiment of the present disclosure may include the following steps S101-S104.

S101, receiving a sensing signal collected by a sensor, calculating, after segmenting the sensing signal into at least one segment signal, a segment energy value of each segment signal, and acquiring a signal band containing a starting point of a signal of a pulse signal based on each segment energy value of each segment signal.

In one embodiment, the device for detecting the starting point of a signal can segment the sensing signal acquired by the sensor into at least one segment signal of an equal duration, and can acquire the segment energy value of each segment signal. It can be understood that based on the sensing signal acquired by the sensor, a measured energy value of the sensing signal at each time point is acquired at the same time. The device for detecting the starting point of a signal can determine several sampling points in the signal band according to a sampling period. The sampling period may be initially set by the device for detecting the starting point of a signal, or may be set by relevant personnel and stored in the device for detecting the starting point of a signal. The segment energy value may include measured energy values corresponding to each sampling point in the segment signal. The device for detecting the starting point of a signal can traverse all segment signals and determine the signal band containing the starting point of a signal of the pulse signal according to the segment energy value of the segment signal.

The device for detecting the starting point of a signal can acquire the signal band according to a relative energy value of each segment signal. The relative energy value is a ratio of the segment energy value of the two adjacent segment signals, for example, a first segment signal is any segment signal in at least one segment signal, the ratio of the segment energy value of the first segment signal to the segment energy value of the prior segment signal of the first segment signal is the relative energy value of the first segment signal. It can be understood that the ratio of the segment energy value can be the ratio of the sum of the measured energy values at each sampling point in the segment energy value. The device for detecting the starting point of a signal can confirm the segment signal with the maximum segment energy value as the signal band.

The device for detecting the starting point of a signal can traverse all the segment signals in chronological order. If a maximum energy value in the segment energy values of a second segment signal is greater than the energy threshold value, it indicates that there is a pulse signal in the second segment signal, and the starting point of a signal of the pulse signal exists in the second segment signal. The energy threshold value may be initially set by the device for detecting the starting point of a signal, or may be set by the relevant personnel and stored in the device for detecting the starting point of a signal. The energy threshold value may be slightly higher than the energy of the noise signal, but less than the energy of the pulse signal. The device for detecting the starting point of a signal may confirm the second segment signal as a signal band containing the starting point of a signal, and may also combine several segment signals before the second segment signal, several segment signals after the second segment signal and the second segment signal to constitute a signal band, to avoid missing the information in the signal.

S102, based on a measured energy value at each sampling point in the signal band, calculating an instantaneous energy value at each sampling point in the signal band by using a sliding window method.

In one embodiment, due to the influence of ADC accuracy, circuit and other noise, the energy value of the sampling point will have certain random fluctuations, resulting in inaccurate measured energy values, so the device for detecting the starting point of a signal can adopt the sliding window method to acquire target sampling points in all sampling points in the signal band, and calculate the average value of the measured energy values of the target sampling point and at least two sampling points around the target sampling point. The average value is taken as the instantaneous energy value of the target sampling point so as to reduce the impact of noise disturbance. The sliding window method involves sliding a window with a certain step length, and calculate the measured energy value of the sampling points in the window, so as to acquire the instantaneous energy value of the target sampling point. For example, by using a sliding window method in which a length of ten sampling periods is taken as a window length and a length of one sampling period is taken as the step length, the average value of the measured energy values of all sampling points in the window is taken as the instantaneous energy value of the target sampling point.

S103, acquiring a first energy ratio between a first sampling point and a second sampling point in the signal band.

In one embodiment, when the pulse signal appears, that is, at the starting point of a signal of the pulse signal, the energy value of the sensing signal will increase sharply. The device for detecting the starting point of a signal can acquire the first energy ratio between the instantaneous energy value of the first sampling point and the instantaneous energy value of the second sampling point in the signal band. Therein, the second sampling point is a prior sampling point of the first sampling point. For example, the first energy ratio between the first sampling point and the second sampling point can be obtained by dividing the instantaneous energy value of the first sampling point by the instantaneous energy value of the second energy value.

S104, if the first energy ratio is greater than an initial-ratio threshold value, determining a sampling time corresponding to the first sampling point as the starting point of a signal.

It can be understood that the energy threshold value is used to determine whether there is a starting point of a signal in the segment signal, and the initial-ratio threshold value is used to determine whether the sampling time corresponding to the sampling point is the starting point of a signal. The energy threshold value and the initial-ratio threshold value have different functions and their values can also be different. The initial-ratio threshold value may be initially set by the device for detecting the starting point of a signal, or may be set by relevant personnel and stored in the device for detecting the starting point of a signal. The initial-ratio threshold value can be a number far greater than 1, for example, it may be set to 10.

In one embodiment, it can be understood that, in the sensing signal, the instantaneous energy value of the starting point of a signal is basically the same as the average instantaneous energy value of the pulse signal, while the prior sampling point of the starting point of a signal is noise, its instantaneous energy value will be very small, which is far less than the average instantaneous energy value of the pulse signal, so the energy ratio between the instantaneous energy value corresponding to the starting point of a signal and the instantaneous energy value corresponding to the prior sampling point is a number far greater than 1. Then, if the device for detecting the starting point of a signal detects that the first energy ratio is greater than the threshold value of the start ratio, it indicates that the sampling time corresponding to the first sampling point is the starting point of a signal of the pulse signal. The threshold value of the start ratio is used to determine whether the sampling point is the starting point of a signal of the pulse signal. For example, the first energy ratio of the first sampling point is greater than the initial-ratio threshold value, which means that the sampling time corresponding to the first sampling point is the starting point of a signal. If the first energy ratio is less than or equal to the initial-ratio threshold value, it means that the sampling time corresponding to the second sampling point is not the starting point of a signal.

In the embodiment of the present disclosure, after the sensing signal is segmented into at least one segment signal, the segment energy value of each segment signal is calculated, and the signal band containing the starting point of a signal of the pulse signal is acquired based on each segment energy value. Based on the measured energy value at each sampling point in the signal band, the instantaneous energy value at each sampling point in the signal band is calculated by using the sliding window method, the first energy ratio between the first sampling point and the second sampling point in the signal band is acquired, and if the first energy ratio is greater than the initial-ratio threshold value, the sampling time corresponding to the first sampling point is determined as the starting point of a signal. The means of calculating the instantaneous energy value by the sliding window method, and finding the starting point of a signal whose energy value increases sharply by using the energy ratio improves the accuracy of detecting the starting point of a signal, thus improves the accuracy of signal feature analysis.

Referring to FIG. 3, FIG. 3 is a flow diagram of a method for detecting a starting point of a signal provided by an embodiment of the present disclosure. As shown in FIG. 3, the method described in the embodiment of the present disclosure can include the following steps S201-S206.

S201, receiving a sensing signal collected by a sensor, calculating, after segmenting the sensing signal into at least one segment signal, a segment energy value of each segment signal, and acquiring a signal band containing a starting point of a signal of a pulse signal based on each segment energy value.

In a first feasible embodiment of the present disclosure, the device for detecting the starting point of a signal can segment the sensing signal acquired by the sensor into at least one segment signal of an equal duration, and can acquire the segment energy value of each segment signal. It can be understood that when the sensor acquires the sensing signal, it can also acquire a measured energy value of the sensing signal at each time point. The device for detecting the starting point of a signal can determine several sampling points in the signal band according to a sampling period. The sampling period may be initially set by the device for detecting the starting point of a signal, or may be set by relevant personnel and stored in the device for detecting the starting point of a signal. The segment energy value may include the measured energy value corresponding to each sampling point in the segment signal. The device for detecting the starting point of a signal may traverse all segment signals and determine the signal band containing the starting point of a signal of the pulse signal according to the segment energy value of the segment signal.

The device for detecting the starting point of a signal may calculate a relative energy value of each segment signal according to each segment energy value and then assign the segment signal with the largest relative energy value as the starting point of a signal containing the pulse signal. The relative energy value is the ratio of the segment energy values of adjacent two segment signals. For example, the first segment signal is any segment signal in at least one segment signal, a first sum of the segment energy values of the first segment signal can be calculated, and the first sum is a sum of the measured energy values at each sampling point in the first segment signal. A second sum of the segment energy values of the prior segment signal of the first segment signal can be calculated, and the second sum is a sum of the measured energy values at each sampling point in the prior segment signal of the first segment signal, and then the ratio of the first sum to the second sum is calculated, which is the relative energy value of the first segment signal. It can be understood that the ratio of the segment energy value can be the ratio of the sums of the measured energy values at each sampling point in the segment energy value. The device for detecting the starting point of a signal can confirm the segment signal with the maximum segment energy value as the signal band containing the starting point of a signal.

In a second feasible embodiment of the present disclosure, the device for detecting the starting point of a signal can further find the signal band containing the starting point of a signal according to the segment energy value of each segment signal in view of a preset energy threshold value that is a threshold value used to determine whether the second segment signal contains the starting point of a signal. The device for detecting the starting point of a signal can traverse all segment signals in chronological order. If the maximum energy value in the segment energy values of the second segment signal is greater than the energy threshold value, it indicates that there is a pulse signal in the second segment signal, and the starting point of a signal of the pulse signal exists in the second segment signal. The energy threshold value may be initially set by the device for detecting the starting point of a signal, or may be set by relevant personnel and stored in the device for detecting the starting point of a signal. The energy threshold value may be slightly higher than the energy of the noise signal, but less than the energy of the pulse signal. In order to avoid losing the information in the pulse signal, and to avoid the estimation error of the signal segment where the starting point of a signal is located, the device for detecting the starting point of a signal can acquire a third segment signal that is before the second segment signal and continuous with the second segment signal, and then acquire a fourth segment signal that is after the second segment signal and continuous with the second segment signal. Therein, the third segment signal can contain the first number of segment signals, the fourth segment signal can contain a second number of segment signals, the first number and the second number can be equal or not equal, and then the third segment signal, the second segment signal and the fourth segment signal are combined to generate a signal band containing the starting point of a signal.

Referring to FIG. 4 together, FIG. 4 provides a diagram of an example of acquiring a signal band provided by an embodiment of the present disclosure. The sensor can segment the sensing signal into several segment signals of an equal duration. The device for detecting the starting point of a signal can traverse all signal bands in chronological order and store them. If the maximum energy value in the segment energy values of the second segment signal is greater than the energy threshold value, the device for detecting the starting point of a signal confirms that the pulse signal occurs in the second segment signal, that is, the starting point of a signal of the pulse signal is in the second segment signal. The device for detecting the starting point of a signal acquires the first number of segment signals in the stored signal segment to constitute the third segment signal, and then acquires the second number of segment signals after the second segment signal to constitute the fourth segment signal. For example, as shown in FIG. 4, the first number and the second number can be the same, both of which are 5, that is, the five segment signals before the second segment signal and the five segment signals after the second segment signal are acquired, and a total of eleven segment signals constitute the signal band.

Optionally, the device for detecting the starting point of a signal estimates the length of the pulse signal based on historical experience and data. The length of the signal band can be an integral multiple of the length of the pulse signal.

In order to acquire complete pulse signal information, the length of the signal band can be greater than twice the length of the pulse signal.

S202, in the signal band, acquiring a sampling-point set containing at least two sampling points based on a target sampling point.

In one embodiment, due to the influence of ADC accuracy, circuit and other noise, the energy value of the sampling point will have certain random fluctuations, resulting in inaccurate measured energy value, so the device for detecting the starting point of a signal can adopt a sliding window method to acquire the target sampling points in all sampling points in the signal band, calculate the average value of the measured energy values of the target sampling point and at least two sampling points around the target sampling point, and assign the average value as the instantaneous energy value of the target sampling point, so as to reduce the impact of noise disturbance. By assigning the target sampling point in several sampling points in the signal band as an example, the target sampling point is any sampling point in the signal band, and the device for detecting the starting point of a signal can acquire, based on the target sampling point, a sampling-point set containing at least two sampling points in the signal band, wherein the points in the sampling-point set are all around the target sampling point.

The device for detecting the starting point of a signal can, in the signal band, assign the target sampling point as the starting point, acquire a first sampling-point set whose sampling time is earlier than that of the target sampling point and whose number meets a first number; and then assign the target sampling point as the starting point, acquire a second sampling-point set whose sampling time is later than that of the target sampling point and whose number meets a second number; and then based on the target sampling point, the first sampling-point set and the second sampling-point set, generate the target sampling-point set. Therein, the first number and the second number can be equal or not equal, which may be initially set by the device for detecting the starting point of a signal, or may be set by relevant personnel and stored in the device for detecting the starting point of a signal.

Optionally, a time interval between a sampling point with the earliest sampling time and a sampling point with the latest sampling time in the target sampling-point set is determined as a window length for calculating the instantaneous energy value by the sliding window method. The sliding window method is to slide the window with a certain step length, and calculate the measured energy values of the sampling points in the window so as to acquire the instantaneous energy value of the target sampling point. The length of the pulse signal can be an integral multiple of the window length, and the sampling time of the target sampling point is an intermediate value of the sampling time of all the sampling points in the target sampling-point set. Referring to FIG. 5, FIG. 5 is a diagram of an example of acquiring an instantaneous energy value provided by an embodiment of the present disclosure. If the window length is the length of ten sampling periods, the first number and the second number are both 5. There are five sampling points in the first sampling-point set, and there also are five sampling points in the second sampling-point set. The target sampling-point set includes eleven sampling points, and then the instantaneous energy value of the target sampling point is calculated based on the measured energy values of all the sampling points in the target sampling-point set. It can be understood that the device for detecting the starting point of a signal uses the sliding window method to acquire the target sampling-point set and calculates the instantaneous energy value, for example, by assigning the length of ten sampling periods as the window length, and assigning the length of one sampling period as the step length, the device for detecting the starting point of a signal determines the sampling-point set by using the sliding window method. For example, in FIG. 5, the instantaneous energy value of sampling point A can be calculated by using the measured energy values of all sampling points in the sampling-point set A, and then the window is slid by the length of a sampling period, and then the instantaneous energy value of sampling point B can be calculated by using the measured energy values of all sampling points in sampling-point set B.

Optionally, if in the signal band, the number of sampling points whose sampling times are earlier than that of the target sampling point is less than the first number, the device for detecting a starting point of a signal may add all the sampling points whose sampling times are earlier than that of the target sampling point in the signal band to the first sampling-point set. Referring to FIG. 6 together, FIG. 6 is a diagram of an example of acquiring a sampling-point set provided by an embodiment of the present disclosure. Assuming that the first number and the second number are both 5, however, the target sampling point is the third sampling point in the signal band, and there are only two sampling points in the signal band whose sampling times are earlier than that of the target sampling point, so the starting point of a signal can add both the first sampling point and the second sampling point to the first sampling-point set, the first number is changed to 2, thus the five sampling points after the target sampling point is added to the second sampling-point set, then the first sampling-point set with two sampling points, the second sampling-point set with five sampling points and the target sampling point constitute the target sampling-point set with eight sampling points. The device for detecting the starting point of a signal can calculate the instantaneous energy value of the target sampling point according to the average value of the measured energy values of the eight sampling points.

It can be understood that if in the signal band, the number of sampling points whose sampling time are later than that of the target sampling point is less than the second number, the device for detecting the starting point of a signal can add all the sampling points in the signal band whose sampling times are later than that of the target sampling point to the second sampling-point set. The instantaneous energy values of all sampling points can be calculated by directly using the data in the signal band without looking for data of other sampling point in the sensing signal, which improves the calculation efficiency of the instantaneous energy value.

Optionally, if in the signal band, the number of sampling points whose sampling times are earlier than that of the target sampling point is less than the first number, the device for detecting a starting point of a signal may acquire the sampling points in the sensing signals so as to make the number of a first average point meet the first number. Further referring to FIG. 7 together, FIG. 7 is a diagram of an example of acquiring a sampling-point set provided by an embodiment of the present disclosure. Assuming that the first number and the second number are both 5, however, the target sampling point is the third sampling point in the signal band, and there are only two sampling points in the signal band whose sampling times are earlier than the target sampling point, so the device for detecting the starting point of a signal can, in the sensing signal, acquire the three sampling points before the signal band, and constitute it with the first sampling point and the second sampling point in the signal band into the first sampling-point set that meets the first number together, and then add the five sampling points after the target sampling point to the second sampling-point set, so the first sampling-point set, the target sampling point and the second sampling-point set includes eleven sampling points. The device for detecting the starting point of a signal can calculate the instantaneous energy value of the target sampling point based on the average value of the measured energy values of the 11 sampling points.

It can be understood that if in the signal band, the number of sampling points whose sampling times are later than that of the target sampling point is less than the second number, the device for detecting the starting point of a signal can acquire sampling points in the sensing signal so as to make the number of the sampling points in the second sampling-pint set meets a second number. The instantaneous energy values of all sampling points can be calculated by using the average value of the measured energy values of the same number sampling points, which improves the accuracy of the instantaneous energy value.

S203, calculating an average value of the measured energy values of all sampling points in the target sampling-point set, and determining the average value as the instantaneous energy value of the target sampling point.

In one embodiment, the device for detecting the starting point of a signal can calculate the average value of the measured energy values of all the sampling points in the target sampling-point set, and then determine the average value as the instantaneous energy value of the target sampling point. The device for detecting the starting point of a signal can acquire squares of the measured energy values of all sampling points in the target sampling-point set, and then add the squares of the measured energy values of all sampling points in the target sampling-point set and divide it by the number of sampling points in the target sampling-point set, and thus obtain the instantaneous energy value of the target sampling point. The formula is as follows.

$$E_j = \frac{1}{L} \sum_{i=j}^{j+L-1} s_i^2$$

Wherein, j=0, 1, 2, . . . , N−1, j refers to the jth sampling time and corresponding sampling point in the signal band, i=0, 1, 2, . . . , N−1, i refers to the ith sampling time and corresponding sampling point in the signal band, while there are N sampling times and corresponding sampling points in the signal band, N refers to the first total number of sampling points in the signal band, $E_j$ refers to the instantaneous energy value corresponding to the sampling point at the jth sampling time, L is the second total number of sampling points in the target sampling-point set, $s_i$ is the measured energy value acquired by the sensor at the ith sampling time, and can also be the instantaneous level acquired by the sensor.

Optionally, the device for detecting the starting point of a signal can calculate the square of the measured energy value corresponding to each sampling point in the target sampling-point set in turn, and then average them; or can directly calculate a sequence containing instantaneous energy values of all sampling points in the signal band by the convolution operation. It can be understood that formula of calculating $E_j$ can be transformed into the multiplication of two matrices:

$$E_j = \frac{1}{L}\sum_{i=j}^{j+L-1} s_i^2 \times 1 = \frac{1}{L}[s_j^2 s_{j+1}^2 \cdots s_{j+L-1}^2] \cdot \begin{bmatrix} 1 \\ 1 \\ \vdots \\ 1 \end{bmatrix} = \frac{1}{L} P_j \cdot h$$

Wherein, $$P_j = [s_j^2 s_{j+1}^2 \cdots s_{j+L-1}^2],$$

$P_j$ is a sequence of the square of the measured energy value at each sampling point in the target sampling-point set containing the sampling point at the jth sampling time, and h is a column matrix whose number of columns meets the second total number and whose elements are all 1, so that the energy value sequence can be directly calculated by the convolution method:

$$E = \frac{1}{L} P * h$$

Wherein, E is an energy value sequence containing the instantaneous energy values of all sampling points in the signal band, $$P = [s_0^2 s_1^2 s_2^2 \cdots s_{N-1}^2],$$

P is a row matrix whose number of columns meets the first total number, the element in P is the square of the measured energy value at each sampling point in the signal band, and h is the column matrix whose number of rows meets the second total number and whose elements are all 1. The convolution operation is performed on P and h, and the result of the convolution operation is divided by the second total number L, and thus the energy value sequence can be obtained, and the instantaneous energy value of the target sampling point can be acquired from the energy value sequence.

Optionally, the computation amount required for the convolution operation is real multiplication by $N\times(N+L-1)$ times, so the device for detecting the starting point of a signal can use fast Fourier transform to accelerate the convolution operation. The device for detecting the starting point of a signal can perform fast Fourier transform on P and h to obtain $F_P$ and $F_h$, multiply points corresponding to $F_P$ and $F_h$, and obtain the energy value sequence by performing inverse fast Fourier transform on the multiplication result and dividing it by the second total number L:

$$F_P = FFT(P)$$

$$F_h = FFT(h)$$

$$Y(k) = F_P(k) \times F_h(k)$$

$$E = \frac{1}{L} \times IFFT(Y)$$

Wherein, k=0, 1, 2, . . . , N−1, IFFT(Y) is the result of inverse fast Fourier transform on Y(k). It can be understood that fast Fourier transform is used to accelerate the convolution operation, which can reduce the number of real multiplication operations, reduce the calculation amount required for detecting the starting point of a signal with the device for detecting the starting point of a signal, thereby improving the detection efficiency.

S204, dividing the instantaneous energy value of the first sampling point by the instantaneous energy value of the second sampling point to obtain a first energy ratio between the first sampling point and the second sampling point.

In one embodiment, when the pulse signal occurs, that is, at the starting point of a signal of the pulse signal, the energy value of the sensing signal will increase sharply. The device for detecting the starting point of a signal can acquire the first energy ratio between the instantaneous energy value of the first sampling point and the instantaneous energy value of the second sampling point in the signal band. Therein, the second sampling point is a prior sampling point of the first sampling point.

S205, if the first energy ratio is greater than an initial-ratio threshold value, determining the sampling time corresponding to the first sampling point as the starting point of a signal.

In one embodiment, the initial-ratio threshold value may be initially set by the device for detecting the starting point of a signal, or may be set by relevant personnel and stored in the device for detecting the starting point of a signal. The initial-ratio threshold value can be a number far greater than 1, for example, it can be set to 10. It can be understood that in the sensing signal, the energy value of the starting point of a signal is basically the same as the energy value of the pulse signal, while the instantaneous energy value of the prior sampling point of the starting point of a signal will be very small, which is far less than the energy value of the pulse signal, so the energy ratio between the instantaneous energy value corresponding to the starting point of a signal and the instantaneous energy value corresponding to the prior sampling point is a number far greater than 1. Therefore, if the device for detecting the starting point of a signal detects that the first energy ratio is greater than the initial-ratio threshold value, it indicates that the sampling time corresponding to the first sampling point is the starting point of a signal of the pulse signal.

Referring to FIG. 8, FIG. 8 is a diagram of an example of an energy ratio curve provided by an embodiment of the present disclosure. When there is no pulse signal in the signal band, the instantaneous energy values between adjacent sampling points are similar, and the energy ratio between adjacent sampling points is approximately 1, for example, in FIG. 8, there is no pulse signal in the time period between $t_0$ and $t_1$, and the energy ratio is close to 1. When the starting point of a signal of the pulse signal occurs, the instantaneous energy value of the starting point of a signal is much greater than the instantaneous energy value of the prior sampling point of the starting point of a signal, and the energy ratio should be a number greater than 1. For example, if the initial-ratio threshold value is 5, in FIG. 8, the energy ratio at sampling time $t_1$ is greater than 5, so the device for detecting the starting point of a signal can determine the sampling time $t_1$ as the starting point of a signal. It can be understood that in the pulse signal, the instantaneous energy values of adjacent sampling points are also basically the same, which are equivalent to the pulse energy of the pulse signal, so the energy ratio between adjacent sampling points in the pulse signal is also approximately 1, and as shown in FIG. 8, the time period between $t_1$ and $t_2$ is the time period when the pulse signal exists. Similarly, the instantaneous energy value at the signal end point of the pulse signal is far less than the pulse energy of the prior sampling point, so the energy ratio of the signal end point of the pulse signal is less than 1. The device for detecting the starting point of a signal can set an end-ratio threshold value. If the energy ratio of the sampling point is less than the end-ratio threshold value, it indicates that the sampling point is the signal end point. If the end-ratio threshold value is 0.5, and the energy ratio at sampling time $t_2$ is less than 0.5, the device for detecting the starting point of a signal can determine the sampling time $t_2$ as the signal end point.

S206, in the sensing signal, assigning the starting point of a signal as the starting point to acquire an effective pulse signal segment whose length meets a set length.

In one embodiment, the device for detecting the starting point of a signal can acquire the set length of the pulse signal, where the set length represents the duration of the pulse signal and can be determined based on historical experience and data estimation. The device for detecting the starting point of a signal can assign the starting point of a signal as the starting point in the sensing signal to acquire the effective pulse signal segment with the length meeting the set length. The effective pulse signal segment contains an entire pulse signal while excluding noise signals before and after the pulse signal, which facilitates analyzing and processing the pulse signal, acquiring the characteristic information of the pulse signal, thereby improving the analysis efficiency of the pulse signal and reducing the computational workload.

Optionally, when the device for detecting the starting point of a signal acquires the effective pulse signal segment, the length of the effective pulse signal segment can be slightly longer than the set length of the pulse signal, so as to avoid losing the information in the pulse signal and ensure the integrity of the pulse signal.

Optionally, the device for detecting the starting point of a signal can not only estimate the set length based on historical experience and data, but also calculate the signal length of the pulse signal based on the signal end point acquired in the signal band. The device for detecting the starting point of a signal can acquire a second energy ratio between a third sampling point and a fourth sampling point in the signal band, and therein, the fourth sampling point is a prior sampling point of the third sampling point. If the second energy ratio is less than the end-ratio threshold value, the device for detecting the starting point of a signal will determine the sampling time corresponding to the third sampling point as the signal end point of the pulse signal. Thus, the set length of the pulse signal can be obtained according to the starting point of a signal and the signal end point. The end-ratio threshold value is used to determine whether the sampling time corresponding to the sampling point is the signal end point of the pulse signal. The end-ratio threshold value can be set to a value greater than 0 and less than 1, for example, it can be set to 0.5.

In the embodiment of the present disclosure, after segmenting the sensing signal into at least one segment signal, the segment energy value of each segment signal is calculated, and the signal band containing the starting point of a signal of the pulse signal is acquired based on the segment energy value. Based on the measured energy value at each sampling point in the signal band, the instantaneous energy value at each sampling point in the signal band is calculated by using the sliding window method. In addition, the convolution operation can be used to calculate the energy value sequence containing the instantaneous energy values of all sampling points in the signal band at one time, and the fast Fourier transform can be used to accelerate the convolution operation, which reduces the number of real multiplication operations, thereby improving the efficiency of detecting starting point of a signals. The first energy ratio between the first sampling point and the second sampling point in the signal band is acquired, and if the first energy ratio is greater than the initial-ratio threshold value, the sampling time corresponding to the first sampling point is determined as the starting point of a signal. The instantaneous energy value is calculated by the sliding window method, and the starting point of a signal whose energy value increases sharply is found by using the energy ratio, which improves the efficiency and accuracy of detecting starting point of a signals, thus improving the accuracy of signal feature analysis. At the same time, the signal end point can be acquired by comparing the second energy ratio and the end-ratio threshold value, and the set length of the pulse signal can be acquired according to the signal end point and the starting point of a signal, so as to obtain the effective pulse signal segment that can be slightly longer than the set length, thereby facilitating the analysis and processing of the pulse signal while ensuring the integrity of the signal, and improving the analysis efficiency of the pulse signal.

Referring to FIG. 9, FIG. 9 is a structural diagram of a device for detecting a starting point of a signal provided by an embodiment of the present disclosure. As shown in FIG. 9, the imaging device in the embodiment of the present disclosure includes a sensor, a processor and a starting-point acquisition module and an effective-segment acquisition module. The processor includes an energy-value calculation module and a ratio calculation module. Therein, the sensor is connected with the energy-value calculation module, the energy-value calculation module is connected with the ratio calculation module, the ratio calculation module is connected with the starting-point acquisition module, and the starting-point acquisition module is connected with the effective-segment acquisition module.

The sensor can convert received information into a sensing signal in the form of an electrical signal, and then the sensor sends the sensing signal to the processor.

The energy-value calculation module may segment the sensing signal acquired by the sensor into at least one segment signal of an equal duration, and can acquire a segment energy value of each segment signal. The segment energy value can include a measured energy value corresponding to each sampling point in the segment signal. The device for detecting the starting point of a signal can traverse all segment signals and determine a signal band containing a starting point of a signal of a pulse signal according to the segment energy value of the segment signal.

Optionally, the energy-value calculation module can acquire the signal band according to a relative energy value of each segment signal. The relative energy value is a ratio of the segment energy value of the two adjacent segment signals, for example, a first segment signal is any segment signal in at least one segment signal, the ratio of the segment energy value of the first segment signal to the segment energy value of the prior segment signal of the first segment signal is the relative energy value of the first segment signal. It can be understood that the ratio of the segment energy value can be a ratio of the sums of the measured energy values at each sampling point in the segment energy value. The energy-value calculation module can confirm the segment signal with the largest segment energy value as the signal band.

Optionally, the energy-value calculation module can traverse all the segment signals in chronological order. If a maximum energy value in the segment energy values of a second segment signal is greater than the energy threshold value, it indicates that there is a pulse signal in the second segment signal, and the starting point of a signal of the pulse signal exists in the second segment signal. The energy threshold value may be initially set by the device for detecting the starting point of a signal, or may be set by the relevant personnel and stored in the device for detecting the starting point of a signal. The energy threshold value may be slightly higher than the energy of the noise signal, but less than the energy of the pulse signal. The energy-value calculation module may confirm the second segment signal as the signal band containing the starting point of a signal, and may also combine several segment signals before the second segment signal, several segment signals after the second segment signal with the second segment signal to constitute the signal band, to avoid missing the information in the signal.

Optionally, the energy-value calculation module estimates the length of the pulse signal based on historical experience and data. The length of the signal band can be an integral multiple of the length of the pulse signal. In order to acquire complete pulse signal information, the length of the signal band can be greater than twice the length of the pulse signal.

When the sensor acquires the sensing signal, it can also acquire the measured energy value of the sensing signal at each time point. The energy-value calculation module can determine several sampling points in the signal band according to a sampling period. The sampling period may be initially set by the device for detecting the starting point of a signal, or may be set by relevant personnel and stored in the device for detecting the starting point of a signal. It can be understood that the smaller the sampling period, the more sampling points in the signal band, and the more accurate the detected starting point of a signal. Due to the influence of ADC accuracy, circuit and other noise, the energy value of the sampling point will have certain random fluctuations, resulting in inaccurate measured energy value, so the device for detecting the starting point of a signal can adopt the sliding window method to acquire a target sampling point in all sampling points in the signal band, and calculate an average value of the measured energy values of the target sampling point and at least two sampling points around the target sampling point. The average value is taken as the instantaneous energy value of the target sampling point so as to reduce the impact of noise disturbance. By assigning the target sampling point in several sampling points of the signal band as an example, the energy-value calculation module can acquire, based on the target sampling point, a sampling-point set containing at least two sampling points in the signal band. The points in the sampling-point set are all around the target sampling point. The energy-value calculation module can, in the signal band, assign the target sampling point as the starting point to acquire a first sampling-point set whose sampling times are earlier than that of the target sampling point and whose number meets a first number; and then in the signal band, assign the target sampling point as the starting point to acquire a second sampling-point set whose sampling times are later than that of the target sampling point and whose number meets a second number; and then based on the target sampling point, the first sampling-point set and the second sampling-point set, generate the target sampling-point set. Therein, the first number and the second number can be equal or not equal, which may be initially set by the device for detecting the starting point of a signal, or may be set by relevant personnel and stored in the device for detecting the starting point of a signal.

The energy-value calculation module can calculate the average value of the measured energy values of all the sampling points in the target sampling-point set, and then determine the average value as the instantaneous energy value of the target sampling point. The energy-value calculation module can acquire squares of the measured energy values of all sampling points in the target sampling-point set, and then add the squares of the measured energy values of all sampling points in the target sampling-point set and divide them by the number of sampling points in the target sampling-point set, and thus obtain the instantaneous energy value of the target sampling point.

Optionally, the energy-value calculation module can also use the convolution operation to directly calculate a sequence containing the instantaneous energy values of all sampling points in the signal band, acquire a row matrix with the number of columns meeting the first total number, wherein an element in the row matrix is a square of the measured energy value at each sampling point in the signal band. And then the energy-value calculation module can acquire a column matrix with the number of rows meeting the second total number and all elements being 1, perform convolution operation on the row matrix and the column matrix, and divide a result of the convolution operation by the second total number to obtain an energy value sequence containing the instantaneous energy values of all sampling points in the signal band.

Optionally, the fast Fourier transform can be used to accelerate the convolution operation. The device for detecting the starting point of a signal can perform fast Fourier transform on column matrix P and row matrix h to obtain $F_P$ and $F_h$, multiply points corresponding to $F_P$ and $F_h$, and obtain the energy value sequence by performing inverse fast Fourier transform on the multiplication result and dividing it by the second total number. Then the energy-value calculation module sends the energy value sequence to the ratio calculation module.

The ratio calculation module can acquire the instantaneous energy value at each sampling point from the energy value sequence, and the ratio calculation module can acquire a first energy ratio between the instantaneous energy value of the first sampling point and the instantaneous energy value of the second sampling point in the signal band, therein the second sampling point is the prior sampling point of the first sampling point. And then the ratio calculation module can send the energy ratio of the first sampling point to the starting-point acquisition module.

It can be understood that in the sensing signal, the energy value of the starting point of a signal is basically the same as the energy value of the pulse signal, while the instantaneous energy value of the prior sampling point of the starting point of a signal will be very small, which is far less than the energy value of the pulse signal, so the energy ratio between the instantaneous energy value corresponding to the starting point of a signal and the instantaneous energy value corresponding to the prior sampling point is a number far greater than 1. Therefore, if the starting-point acquisition module detects that the first energy ratio is greater than the initial-ratio threshold value, it indicates that the sampling time corresponding to the first sampling point is the starting point of a signal of the pulse signal. Therein, the initial-ratio threshold value may be initially set by the device for detecting the starting point of a signal, or may be set by relevant personnel and stored in the device for detecting the starting point of a signal. The initial-ratio threshold value can be a number far greater than 1, for example, it may be set to 10. Optionally, the ratio calculation module will send the energy ratio corresponding to each sampling point to the starting-point acquisition module. For example, the ratio calculation module can also acquire a second energy ratio between a third sampling point and a fourth sampling point in the signal band, and send the second energy ratio to the starting-point acquisition module, therein the fourth sampling point is the prior sampling point of the third sampling point. If the second energy ratio is less than the end-ratio threshold value, the starting-point acquisition module may determine the sampling time corresponding to the third sampling point as the signal end point of the pulse signal, and thus the signal length of the pulse signal can be obtained according to the starting point of a signal and signal end point. The starting-point acquisition module can send the starting point of a signal and signal end point to the effective-segment acquisition module.

The effective-segment acquisition module can acquire a set length of the pulse signal according to the starting point of a signal and signal end point, and then assigns the starting point of a signal as the starting point in the sensing signal to acquire the effective pulse signal segment with the length meeting the set length. The effective pulse signal segment contains an entire pulse signal, but does not contain the noise signal before and after the pulse signal, which facilitates analyzing and processing the pulse signal, acquiring the feature information of the pulse signal, thereby improving the analysis efficiency of the pulse signal and reducing the computational workload. Optionally, when the effective-segment acquisition module acquires the effective pulse signal segment, the duration of the effective pulse signal segment can be slightly longer than the set length of the pulse signal, so as to avoid losing the information in the pulse signal and ensure the integrity of the pulse signal.

In the embodiment of the present disclosure, after segmenting the sensing signal into at least one segment signal, the segment energy value of each segment signal is calculated, and the signal band containing the starting point of a signal of the pulse signal is acquired based on each segment energy value. Based on the measured energy value at each sampling point in the signal band, the instantaneous energy value at each sampling point in the signal band is calculated by using the sliding window method. In addition, the convolution operation can be used to calculate the energy value sequence containing the instantaneous energy values of all sampling points in the signal band at one time, and the fast Fourier transform can be used to accelerate the convolution operation, which reduces the number of real multiplication operations, thereby improving the efficiency of detecting starting point of a signals. The first energy ratio between the first sampling point and the second sampling point in the signal band is acquired, and if the first energy ratio is greater than the initial-ratio threshold value, the sampling time corresponding to the first sampling point is determined as the starting point of a signal. The instantaneous energy value is calculated by the sliding window method, and the starting point of a signal whose energy value increases sharply is found by using the energy ratio, which improves the efficiency and accuracy of detecting starting point of a signals, thus improving the accuracy of signal feature analysis. At the same time, the signal end point can be acquired by comparing the second energy ratio and the end-ratio threshold value, and the set length of the pulse signal can be acquired according to the signal end point and the starting point of a signal, so as to obtain the effective pulse signal segment, which can be slightly longer than the set length, thereby facilitating the analysis and processing of the pulse signal while ensuring the integrity of the signal, and improving the analysis efficiency of the pulse signal.

Figure 11:
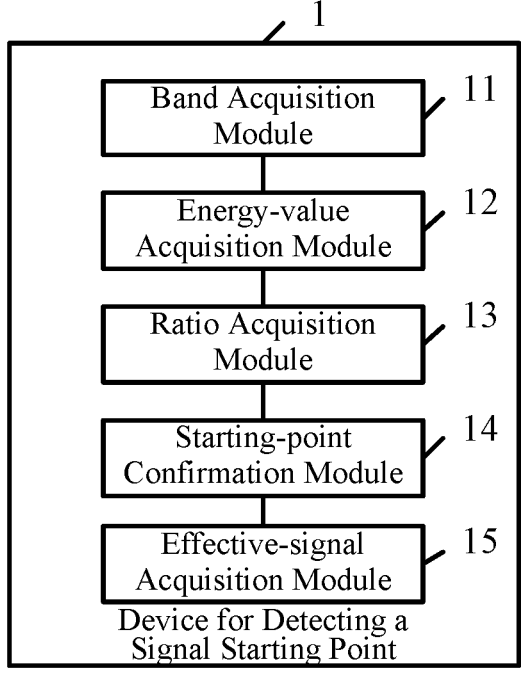
FIG. 11 is a structural diagram of a device for detecting a starting point of a signal provided by an embodiment of the present disclosure.

Hereinafter, the device for detecting the starting point of a signal provided by embodiments of the present disclosure will be described in detail in conjunction with FIGS. 10-11. It should be noted that the device for detecting the starting point of a signal in FIGS. 10-11 is used to implement the method of the embodiment shown in FIG. 2 and FIG. 3 of the present disclosure. For the convenience of explanation, only the parts related to the embodiment of the present disclosure are shown. If the specific technical details are not disclosed, reference is made to the embodiments shown in FIGS. 2 and 3 of the present disclosure.

Referring to FIG. 10, FIG. 10 shows a structural diagram of a device for detecting a starting point of a signal provided by an embodiment of the present disclosure. The device for detecting the starting point of a signal can become all or a part of a device through software, hardware or a combination of both. The device 1 includes a band acquisition module 11, an energy-value acquisition module 12, a ratio acquisition module 13 and a starting-point determination module 14.

The band acquisition module 11 is configured to receive a sensing signal collected by a sensor; after segmenting the sensing signal into at least one segment signal, calculate a segment energy value of each segment signal, and acquire a signal band containing a starting point of a signal of a pulse signal based on each segment energy value.

The energy-value acquisition module 12 is configured to, based on a measured energy value at each sampling point in the signal band, calculate an instantaneous energy value at each sampling point in the signal band by using a sliding window method.

The ratio acquisition module 13 is configured to acquire a first energy ratio between a first sampling point and a second sampling point in the signal band, wherein the second sampling point is a prior sampling point of the first sampling point.

The starting-point determination module 14 is configured to, if the first energy ratio is greater than an initial-ratio threshold value, determine a sampling time corresponding to the first sampling point as the starting point of a signal, wherein the initial-ratio threshold value is a preset threshold value for determining the starting point of a signal.

In the embodiment of the present disclosure, after segmenting the sensing signal into at least one segment signal, the segment energy value of each segment signal is calculated, and the signal band containing the starting point of a signal of the pulse signal is acquired based on each segment energy value. And, based on the measured energy value at each sampling point in the signal band, the instantaneous energy value at each sampling point in the signal band is calculated by using the sliding window method, the first energy ratio between the first sampling point and the second sampling point in the signal band is acquired, and if the first energy ratio is greater than an initial-ratio threshold value, the sampling time corresponding to the first sampling point is determined as the starting point of a signal. The means of calculating the instantaneous energy value by the sliding window method, and finding the starting point of a signal whose energy value increases sharply by using the energy ratio improves the accuracy of detecting the starting point of a signal, thus improves the accuracy of signal feature analysis.

Referring to FIG. 11, FIG. 11 shows a structural diagram of a device for detecting a starting point of a signal provided by an embodiment of the present disclosure. The device for detecting the starting point of a signal can become all or a part of the device through software, hardware or a combination of both. The device 1 includes a band acquisition module 11, an energy-value acquisition module 12, a ratio acquisition module 13, a starting-point determination module 14 and an effective-signal acquisition module 15.

The band acquisition module 11 is configured to receive a sensing signal collected by a sensor; after segmenting the sensing signal into at least one segment signal, calculate a segment energy value of each segment signal, and acquire a signal band containing a starting point of a signal of a pulse signal based on each segment energy value, wherein the initial-ratio threshold value is a preset threshold value for determining the starting point of a signal Optionally, the band acquisition module 11 is specifically configured to calculate a relative energy value of each segment signal based on each segment energy value; and
    acquire the segment signal with the largest relative energy value as the signal band containing the starting point of a signal of the pulse signal.

Optionally, the band acquisition module 11 is specifically configured to calculate a first sum of the segment energy values of a first segment signal and calculate a second sum of the segment energy values of the prior segment signal of the first segment signal; and
    calculate a ratio of the first sum to the second sum, and determine the ratio as the relative energy value of the first segment signal;
    therein, the segment energy value includes the measured energy value at each sampling point in the segment signal, and the first segment signal is any segment signal in the at least one segment signal.

Optionally, the band acquisition module 11 is specifically configured to, based on the segment energy value, acquire the signal band containing the starting point of a signal of the pulse signal from each segment signal in view of a preset energy threshold value.

Optionally, the band acquisition module 11 is specifically configured to: if a maximum energy value in the segment energy value of the second segment signal is greater than the energy threshold value, determine that the second segment signal contains the starting point of a signal of the pulse signal, wherein the segment energy value contains a measured energy value at each sampling point in the segment signal, and the energy threshold value is a threshold value used to determine whether the second segment signal contains the starting point of a signal, and the second segment signal is any segment signal in the at least one segment signal;
    acquire a third segment signal that is before the second segment signal and continuous with the second segment signal, and acquire a fourth segment signal that is after the second segment signal and continuous with the second segment signal; and
    based on the second segment signal, the third segment signal and the fourth segment signal, generate a signal band containing the starting point of a signal.

The energy-value acquisition module 12 is configured to, based on a measured energy value at each sampling point in the signal band, calculate an instantaneous energy value at each sampling point in the signal band by using a sliding window method.

Optionally, the energy-value acquisition module 12 is specifically configured to, in the signal band, acquire a target sampling-point set containing at least two sampling points based on a target sampling point, wherein the target sampling point is any sampling point in the signal band; and
    calculate an average value of the measured energy values of all sampling points in the target sampling-point set, and determine the average value as the instantaneous energy value of the target sampling point.

Optionally, the energy-value acquisition module 12 is specifically configured to: in the signal band, assign the target sampling point as the starting point, acquire a sampling point whose sampling time is earlier than that of the target sampling point, and generate a first sampling-point set of which the number meets a first number;
    in the signal band, assign the target sampling point as the starting point, acquire a sampling point whose sampling time is later than that of the target sampling point, and generate a second sampling-point set of which the number meets a second number; and
    based on the target sampling point, the first sampling-point set and the second sampling-point set, generate the target sampling-point set.

Optionally, the energy-value acquisition module 12 is specifically configured to: acquire a first total number of sampling points in the signal band, and acquiring a second total number of sampling points in the target sampling-point set;
    acquire a row matrix with the number of columns meeting the first total number, wherein an element in the row matrix is a square of the measured energy value at each sampling point in the signal band;
    acquire a column matrix with the number of rows meeting the second total number and all elements being 1;
    perform convolution operation on the row matrix and the column matrix; and
    divide a result of the convolution operation by the second total number to obtain an energy value sequence containing the instantaneous energy values of all sampling points in the signal band, and acquire the instantaneous energy value of the target sampling point in the energy value sequence.

Optionally, the energy-value acquisition module 12 is specifically configured to perform convolution operation on the row matrix and the column matrix, and use fast Fourier transform to accelerate the convolution operation.

The ratio acquisition module 13 is configured to acquire a first energy ratio between a first sampling point and a second sampling point in the signal band, wherein the second sampling point is a prior sampling point of the first sampling point.

Optionally, the ratio acquisition module 13 is specifically configured to divide the instantaneous energy value of the first sampling point by the instantaneous energy value of the second sampling point to obtain the first energy ratio between the first sampling point and the second sampling point.

The starting-point determination module 14 is configured to, if the first energy ratio is greater than an initial-ratio threshold value, determine a sampling time corresponding to the first sampling point as the starting point of a signal.

The effective-signal acquisition module 15 is configured to, in the sensing signal, assign the starting point of a signal as the starting point to acquire an effective pulse signal segment whose length meets a set length.

Optionally, the effective-signal acquisition module 15 is specifically configured to: acquire a second energy ratio between a third sampling point and a fourth sampling point in the signal band, wherein the fourth sampling point is a prior sampling point of the third sampling point;
    if the second energy ratio is less than an end-ratio threshold value, determine a sampling time corresponding to the third sampling point as a signal end point of the pulse signal; and
    determine a set length of the pulse signal based on the starting point of a signal and the signal end point.

In the embodiment of the present disclosure, after segmenting the sensing signal into at least one segment signal, the segment energy value of each segment signal is calculated, and the signal band containing the starting point of a signal of the pulse signal is acquired based on each segment energy value, and based on the measured energy value at each sampling point in the signal band, the instantaneous energy value at each sampling point in the signal band is calculated by using the sliding window method. In addition, the convolution operation can be used to calculate the energy value sequence containing the instantaneous energy values of all sampling points in the signal band at one time, and the fast Fourier transform can be used to accelerate the convolution operation, which reduces the number of real multiplication operations, and improves the efficiency of detecting starting point of a signals. The first energy ratio between the first sampling point and the second sampling point in the signal band is acquired, and if the first energy ratio is greater than the initial-ratio threshold value, the sampling time corresponding to the first sampling point is determined as the starting point of a signal. The instantaneous energy value is calculated by using the sliding window method, and the starting point of a signal whose energy value increases sharply is found by using the energy ratio, which improves the efficiency and accuracy of detecting starting point of a signals, thus improving the accuracy of signal feature analysis. At the same time, the signal end point can be acquired by comparing the second energy ratio and an end-ratio threshold value, and the set length of the pulse signal can be acquired according to the signal end point and the starting point of a signal, so as to obtain the effective pulse signal segment that can be slightly longer than the set length, thereby facilitating the analysis and processing of the pulse signal while ensuring the integrity of the signal, and improving the analysis efficiency of the pulse signal.

It should be noted that when the device for detecting the starting point of a signal provided by the above embodiment performs the method for detecting the starting point of a signal, only the division of above functional modules is illustrated. In practical applications, the above functions can be allocated to different functional modules according to needs, that is, the internal structure of the device can be divided into different functional modules, so as to complete all or a part of the functions described above. In addition, the device for detecting the starting point of a signal provided by the above embodiment and the embodiment of the method for detecting the starting point of a signal belong to the same concept, and the implementation process is detailed in the method embodiment, which will not be repeated herein.

The above serial number of the embodiments of the present disclosure is only for description, and does not represent the advantages and disadvantages of the embodiments.

An embodiment of the present disclosure further provides a computer storage medium. The computer storage medium can store multiple instructions. The instructions are suitable for the processor to load and execute the method for detecting the starting point of a signal as shown in the embodiments shown in FIGS. 2 to 8 above. The specific implementation process can be referred to the specific description of the embodiments shown in FIGS. 2 to 8, and will not be described here.

The present disclosure further provides a computer program product, which stores at least one instruction. The processor loads the at least one instruction and executes the method for detecting the starting point of a signal as shown in the embodiments shown in FIGS. 2 to 8 above. The specific implementation process can be seen in the specific description of the embodiments shown in FIGS. 2 to 8, and will not be described here.

Figure 12:
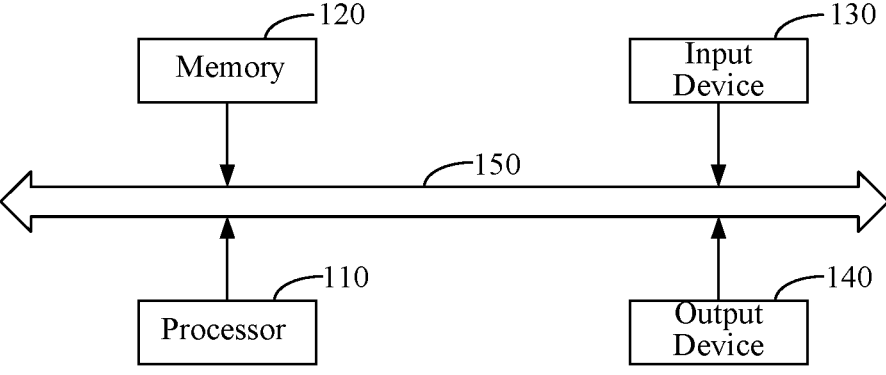
FIG. 12 is a structural diagram of an electronic device provided by an embodiment of the present disclosure.

Referring to FIG. 12, FIG. 12 shows a structural diagram of an electronic device provided by an embodiment of the present disclosure. The electronic device in the present disclosure may include one or more of the following components: a processor 110, a memory 120, an input device 130, an output device 140 and a bus 150. The processor 110, the memory 120, the input device 130 and the output device 140 may be connected through the bus 150.

The processor 110 may include one or more processing cores. The processor 110 uses various interfaces and lines to connect various parts of the entire electronic device, and executes various functions of the terminal 100 and processes data by running or executing instructions, programs, code sets or instruction sets stored in the memory 120, and calling data stored in the memory 120. Optionally, the processor 110 can be implemented in at least one hardware form of digital signal processing (DSP), field-programmable gate array (FPGA), and programmable logic array (PLA). The processor 110 can integrate one or several combinations of central processing unit (CPU), graphics processing unit (GPU), modem, etc. Therein, CPU mainly deals with operating system, user pages and application programs; GPU is used to render and draw the displayed content; the modem is used to handle wireless communication. It can be understood that the above modem can also be implemented by a single communication chip without being integrated into the processor 110.

The memory 120 may include random access memory (RAM), and may also include read-only memory (ROM). Optionally, the memory 120 includes a non-transient computer-readable storage medium. The memory 120 may be used to store instructions, programs, codes, code sets, or instruction sets. The memory 120 may include a program storage area and a data storage area, and therein, the program storage area may store the instructions for realizing the operating system, the instructions for realizing at least one function (such as touch function, sound playback function, image playback function, etc.), and the instructions for realizing the embodiments of the above methods. The operating system may be Android system, a system developed in depth based on the Android system, IOS system developed by Apple Inc., a system developed in depth based on IOS system or other systems.

The memory 120 can be divided into operating system space and user space. The operating system runs in the operating system space, and native applications and third-party applications run in the user space. In order to ensure that different third-party applications can achieve better performance, the operating system allocates corresponding system resources for different third-party applications. However, different application scenarios in the same third-party application also have different requirements for system resources. For example, in the local resource loading scenario, third-party applications have higher requirements for disk read speed; in animation rendering scenarios, third-party applications require higher GPU performance. However, the operating system and third-party applications are independent from each other, and the operating system often cannot perceive the current application scenario of third-party applications in time, which causes the operating system to fail to perform targeted system resource adaptation according to the specific application scenario of third-party applications.

In order to enable the operating system to distinguish the specific application scenarios of third-party applications, it is necessary to get through the data communication between third-party applications and the operating system, so that the operating system can acquire the current scenario information of third-party applications at any time, and then perform targeted system resource adaptation based on the current scenario.

Therein, the input device 130 is configured to receive input instructions or data, and the input device 130 includes but is not limited to a keyboard, mouse, camera, microphone or touch device. The output device 140 is configured to output instructions or data, and the output device 140 includes but is not limited to display devices, speakers, etc. In one example, the input device 130 and the output device 140 can be combined, and the input device 130 and the output device 140 is a touch screen.

The touch screen can be designed as a full screen, a curved screen or a special-shaped screen. The touch screen can also be designed as a combination of full screen and curved screen, and the combination of special-shaped screen and curved screen, which is not limited in the embodiment of the present disclosure.

In addition, those skilled in the art can understand that the structure of the electronic device shown in the above drawings does not constitute a limitation on the electronic device, and the electronic device may include more or fewer components than those shown in the figure, or combine some components, or arrange different components. For example, electronic equipment further includes radio frequency circuit, input unit, sensor, audio circuit, wireless fidelity (Wi-Fi) module, power supply, Bluetooth module and other components, which will not be repeated herein.

In the electronic device shown in FIG. 12, the processor 110 can be configured to call the application for detecting the signal start point stored in the memory 120, and specifically perform the following operations:

receiving a sensing signal collected by a sensor;

after segmenting the sensing signal into at least one segment signal, calculating a segment energy value of each segment signal, and acquiring a signal band containing a starting point of a signal of a pulse signal based on the segment energy value;

based on a measured energy value at each sampling point in the signal band, calculating an instantaneous energy value at each sampling point in the signal band by using a sliding window method;

acquiring a first energy ratio between a first sampling point and a second sampling point in the signal band, wherein the second sampling point is a prior sampling point of the first sampling point; and if the first energy ratio is greater than an initial-ratio threshold value, determining a sampling time corresponding to the first sampling point as the starting point of a signal, wherein the initial-ratio threshold value is a preset threshold value for determining the starting point of a signal.

In one embodiment, when performing the operation of acquiring the signal band containing the starting point of a signal of the pulse signal based on the segment energy value, the processor 110 specifically performs the following operations:

calculating a relative energy value of each segment signal based on the segment energy value; and acquiring a segment signal with the largest relative energy value as the signal band containing the starting point of a signal of the pulse signal.

In one embodiment, when performing the operation of calculating the relative energy value of each segment signal based on the segment energy value, the processor 110 specifically performs the following operations:

calculating a first sum of the segment energy values of a first segment signal and calculating a second sum of the segment energy values of a prior segment signal of the first segment signal; and calculating a ratio of the first sum to the second sum, and determining the ratio as the relative energy value of the first segment signal;

wherein the segment energy value includes the measured energy value at each sampling point in the segment signal, and the first segment signal is any segment signal in the at least one segment signal.

In one embodiment, when performing the operation of acquiring the signal band containing the starting point of a signal of the pulse signal based on each segment energy value, the processor 110 specifically performs the following operations:

based on each segment energy value, acquiring the signal band containing the starting point of a signal of the pulse signal from each segment signal in view of a preset energy threshold value.

In one embodiment, when performing the operation of acquiring, based on the segment energy value, the signal band containing the starting point of a signal of the pulse signal from each segment signal in view of the preset energy threshold value, the processor 110 specifically performs the following operations:

if a maximum energy value in the segment energy value of the second segment signal is greater than the energy threshold value, determining that the second segment signal contains the starting point of a signal of the pulse signal, wherein the segment energy value contains a measured energy value at each sampling point in the segment signal, and the energy threshold value is a threshold value used to determine whether the second segment signal contains the starting point of a signal, and the second segment signal is any segment signal in the at least one segment signal;

acquiring a third segment signal that is before the second segment signal and continuous with the second segment signal, and acquiring a fourth segment signal that is after the second segment signal and continuous with the second segment signal; and based on the second segment signal, the third segment signal and the fourth segment signal, generating a signal band containing the starting point of a signal.

In one embodiment, when performing the operation of calculating, based on the measured energy value at each sampling point in the signal band, the instantaneous energy value at each sampling point in the signal band by using the sliding window method, the processor 110 specifically performs the following operations:

in the signal band, acquiring a target sampling-point set containing at least two sampling points based on a target sampling point, wherein the target sampling point is any sampling point in the signal band; and calculating an average value of the measured energy values of all sampling points in the target sampling-point set, and determining the average value as the instantaneous energy value of the target sampling point.

In one embodiment, when performing the operation of acquiring, in the signal band, the sampling-point set containing at least two sampling points based on the target sampling point, the processor 110 specifically performs the following operations:

in the signal band, assigning the target sampling point as the starting point to acquire sampling points whose sampling time is earlier than that of the target sampling point, and generating a first sampling-point set meeting a first number;

in the signal band, assigning the target sampling point as the starting point to acquire sampling points whose sampling time is later than that of the target sampling point, and generating a second sampling-point set meeting a second number; and based on the target sampling point, the first sampling-point set and the second sampling-point set, generating the target sampling-point set.

In one embodiment, when performing the operation of calculating the average value of the measured energy values of all sampling points in the target sampling-point set, and determining the average value as the instantaneous energy value of the target sampling point, the processor 110 specifically performs the following operations:

acquiring a first total number of sampling points in the signal band, and acquiring a second total number of sampling points in the target sampling-point set;

acquiring a row matrix with the number of columns meeting the first total number, wherein an element in the row matrix is a square of the measured energy value at each sampling point in the signal band;

acquiring a column matrix with the number of rows meeting the second total number and all elements being 1;

performing convolution operation on the row matrix and the column matrix; and dividing a result of the convolution operation by the second total number to obtain an energy value sequence containing the instantaneous energy values of all sampling points in the signal band, and acquiring the instantaneous energy value of the target sampling point in the energy value sequence.

In one embodiment, when performing the operation of performing convolution operation on the row matrix and the column matrix, the processor 110 specifically performs the following operations:

performing convolution operation on the row matrix and the column matrix, and using fast Fourier transform to accelerate the convolution operation.

In one embodiment, when performing the operation of acquiring the first energy ratio between the first sampling point and the second sampling point in the signal band, the processor 110 specifically performs the following operations:

dividing the instantaneous energy value of the first sampling point by the instantaneous energy value of the second sampling point to obtain the first energy ratio between the first sampling point and the second sampling point.

In one embodiment, when performing the method for detecting a starting point of a signal, the processor 110 further performs the following operations:

in the sensing signal, assigning the starting point of a signal as the starting point to acquire an effective pulse signal segment whose length meets a set length.

In one embodiment, when performing the operation of assigning, in the sensing signal, the starting point of a signal as the starting point to acquire the effective pulse signal segment whose length meets the set length, the processor 110 further performs the following operations:

acquiring a second energy ratio between a third sampling point and a fourth sampling point in the signal band, wherein the fourth sampling point is a prior sampling point of the third sampling point;

if the second energy ratio is less than an end-ratio threshold value, determining the sampling time corresponding to the third sampling point as the signal end point of the pulse signal; and determining the set length of the pulse signal based on the starting point of a signal and the signal end point.

In this embodiment, after segmenting the sensing signal into at least one segment signal, the segment energy value of each segment signal is calculated, and the signal band containing the starting point of a signal of the pulse signal is acquired based on the segment energy value, and based on the measured energy value at each sampling point in the signal band, the instantaneous energy value at each sampling point in the signal band is calculated by using the sliding window method. In addition, the convolution operation can be used to calculate the energy value sequence containing the instantaneous energy values of all sampling points in the signal band at one time, and the fast Fourier transform can be used to accelerate the convolution operation, which reduces the number of real multiplication operations, and improves the efficiency of detecting starting point of a signals. The first energy ratio between the first sampling point and the second sampling point in the signal band is acquired, and if the first energy ratio is greater than an initial-ratio threshold value, the sampling time corresponding to the first sampling point is determined as the starting point of a signal. The instantaneous energy value is calculated by the sliding window method, and the starting point of a signal whose energy value increases sharply is found by using the energy ratio, which improves the efficiency and accuracy of detecting starting point of a signals, thus improving the accuracy of signal feature analysis. At the same time, the signal end point can be acquired by comparing the second energy ratio and the end-ratio threshold value, and the set length of the pulse signal can be acquired according to the signal end point and the starting point of a signal, so as to obtain the effective pulse signal segment that can be slightly longer than the set length, thereby facilitating the analysis and processing of the pulse signal while ensuring the integrity of the signal, and improving the analysis efficiency of the pulse signal.

Those skilled in the art can understand that all or a part of the processes in the above embodiments can be completed by instructing the relevant hardware through a computer program. The program can be stored in a computer-readable storage medium. When the program is executed, it can include the processes in the above embodiments of each method. Therein, the storage medium can be magnetic disk, optical disk, read-only storage memory, random storage memory, etc.

The above disclosure is only preferred embodiments of the present disclosure, and obviously, it cannot be used to limit the claimed scope of the present disclosure. Therefore, the equivalent changes made according to the claims of the present disclosure are still covered by the present disclosure.

What is claimed is:

1. A method for detecting a starting point of a signal, the method comprising:

receiving a sensing signal collected by a sensor;

responsive to segmenting the sensing signal into at least one segment signal, calculating a segment energy value for each of the at least one segment signal, and acquiring a signal band containing a starting point of the signal of a pulse signal based on each segment energy value;

based on a measured energy value at each sampling point in the signal band, calculating an instantaneous energy value at each sampling point in the signal band by using a sliding window method;

acquiring a first energy ratio between the instantaneous energy value of a first sampling point and the instantaneous energy value of a second sampling in the signal band, wherein the second sampling point is a prior sampling point of the first sampling point; and if the first energy ratio is greater than an initial-ratio threshold value, determining a sampling time corresponding to the first sampling point as the starting point of the signal, wherein the initial-ratio threshold value is a preset threshold value used to determine the starting point of the signal.

2. The method according to claim 1, wherein acquiring the signal band containing the starting point of the signal of the pulse signal based on each segment energy value further comprises:

calculating a relative energy value for each of the at least one segment signal based on each segment energy value; and acquiring a segment signal with a largest relative energy value as the signal band containing the starting point of the signal of the pulse signal.

3. The method according to claim 2, wherein calculating the relative energy value for each of the at least one segment signal based on each segment energy value further comprises:

calculating a first sum of the segment energy values for a first segment signal and calculating a second sum of the segment energy values for a prior segment signal of the first segment signal; and calculating a ratio of the first sum to the second sum, and determining the ratio as the relative energy value of the first segment signal;

wherein the segment energy value includes the measured energy value at each sampling point in the segment signal, and the first segment signal is any segment signal in the at least one segment signal.

4. The method according to claim 1, wherein acquiring the signal band containing the starting point of the signal of the pulse signal based on each segment energy value further comprises:

based on each segment energy value, acquiring the signal band containing the starting point of the signal of the pulse signal from each segment signal in view of a preset energy threshold value.

5. The method according to claim 4, wherein acquiring, based on each segment energy value, the signal band containing the starting point of the signal of the pulse signal from each segment signal in view of the preset energy threshold value further comprises:

if a segment energy value of a second segment signal is greater than the energy threshold value, determining that the second segment signal contains the starting point of the signal of the pulse signal, wherein the segment energy value contains the measured energy value at each sampling point in the segment signal, and the energy threshold value is a threshold value used to determine whether the second segment signal contains the starting point of the signal, and the second segment signal is any segment signal in the at least one segment signal;

acquiring a third segment signal that is prior to the second segment signal and continuous with the second segment signal, and acquiring a fourth segment signal that is after the second segment signal and continuous with the second segment signal; and based on the second segment signal, the third segment signal and the fourth segment signal, generating a signal band containing the starting point of the signal.

6. The method according to claim 1, wherein calculating, based on the measured energy value at each sampling point in the signal band, the instantaneous energy value at each sampling point in the signal band by using the sliding window further comprises:

in the signal band, acquiring a target sampling-point set containing at least two sampling points based on a target sampling point, wherein the target sampling point is any sampling point in the signal band; and calculating an average value of the measured energy values at all sampling points in the target sampling-point set, and determining the average value as the instantaneous energy value at the target sampling point.

7. The method according to claim 6, wherein acquiring, in the signal band, the target sampling-point set containing at least two sampling points based on the target sampling point further comprises:

in the signal band, assigning the target sampling point as a starting point, acquiring the sampling point whose sampling time is prior to that at the target sampling point, and generating a first sampling-point set meeting a first number;

in the signal band, assigning the target sampling point as the starting point, acquiring the sampling point whose sampling time is later than that of the target sampling point, and generating a second sampling-point set meeting a second number; and based on the target sampling point, the first sampling-point set and the second sampling-point set, generating the target sampling-point set.

8. The method according to claim 6, wherein calculating the average value of the measured energy values at all sampling points in the target sampling-point set, and determining the average value as the instantaneous energy value of the target sampling point further comprises:

acquiring a first total number of sampling points in the signal band, and acquiring a second total number of sampling points in the target sampling-point set;

acquiring a row matrix with a number of columns meeting the first total number, wherein an element in the row matrix is a square of the measured energy value at each sampling point in the signal band;

acquiring a column matrix with the number of rows meeting the second total number and all elements being 1;

performing convolution operation on the row matrix and the column matrix; and dividing a result of the convolution operation by the second total number to obtain an energy value sequence containing the instantaneous energy values at all sampling points in the signal band, and acquiring the instantaneous energy value at the target sampling point in the energy value sequence.

9. The method according to claim 8, wherein performing convolution operation on the row matrix and the column matrix further comprises:

performing the convolution operation on the row matrix and the column matrix, and using fast Fourier transform to accelerate the convolution operation.

10. The method according to claim 1, wherein acquiring the first energy ratio between the first sampling point and the second sampling point in the signal band further comprises:

dividing the instantaneous energy value at the first sampling point by the instantaneous energy value at the second sampling point to obtain the first energy ratio between the first sampling point and the second sampling point.

11. The method according to claim 1, further comprising:

in the sensing signal, assigning the starting point of the signal as a starting point to acquire an effective pulse signal segment whose length meets a set length.

12. The method according to claim 11, wherein assigning, in the sensing signal, the starting point of the signal as the starting point to acquire the effective pulse signal segment whose length meets the set length further comprises:

acquiring a second energy ratio between a third sampling point and a fourth sampling point in the signal band, wherein the fourth sampling point is a prior sampling point of the third sampling point;

if the second energy ratio is less than an end-ratio threshold value, determining a sampling time corresponding to the third sampling point as the signal end point of the pulse signal; and determining the set length of the pulse signal based on the starting point of the signal and the signal end point.

13. An electronic device, comprising a processor and a memory, wherein the memory is to store a computer program and transfer the computer program to the processor;

the processor is to:

receive a sensing signal collected by a sensor;

responsive to segmenting the sensing signal into at least one segment signal, calculate a segment energy value for each of the at least one segment signal, and acquiring a signal band containing a starting point of the signal of a pulse signal based on each segment energy value;

based on a measured energy value at each sampling point in the signal band, calculate an instantaneous energy value at each sampling point in the signal band by using a sliding window method;

acquire a first energy ratio between the instantaneous energy value of a first sampling point and the instantaneous energy value of a second sampling point in the signal band, wherein the second sampling point is a prior sampling point of the first sampling point; and if the first energy ratio is greater than an initial-ratio threshold value, determine a sampling time corresponding to the first sampling point as the starting point of the signal, wherein the initial-ratio threshold value is a preset threshold value used to determine the starting point of the signal.

14. The device of claim 13, wherein to acquire the signal band containing the starting point of the signal of the pulse signal based on each segment energy value, the processor is further to:

calculate a relative energy value for each of the at least one segment signal based on each segment energy value; and acquire a segment signal with a largest relative energy value as the signal band containing the starting point of the signal of the pulse signal.

15. The device of claim 14, wherein to calculate the relative energy value for each of the at least one segment signal based on each segment energy value, the processor is further to:

calculate a first sum of measured energy values at each sampling point in a first segment signal and calculating a second sum of measured energy values at each sampling point in a prior segment signal of the first segment signal; and calculate a ratio of the first sum to the second sum, and determining the ratio as the relative energy value of the first segment signal, wherein the segment energy value includes the measured energy value at each sampling point in the segment signal, and the first segment signal is any segment signal in the at least one segment signal.

16. The device of claim 13, wherein to acquire the signal band containing the starting point of the signal of the pulse signal based on each segment energy value, the processor is further to:

based on each segment energy value, acquire the signal band containing the starting point of the signal of the pulse signal from each segment signal in view of a preset energy threshold value.

17. The device of claim 16, wherein to acquire, based on each segment energy value, the signal band containing the starting point of the signal of the pulse signal from each segment signal in view of the preset energy threshold value, the processor is further to:

if a segment energy value of a second segment signal is greater than the energy threshold value, determine that the second segment signal contains the starting point of the signal of the pulse signal, wherein the segment energy value contains the measured energy value at each sampling point in the segment signal, and the energy threshold value is a threshold value used to determine whether the second segment signal contains the starting point of the signal, and the second segment signal is any segment signal in the at least one segment signal;

acquire a third segment signal that is prior to the second segment signal and continuous with the second segment signal, and acquiring a fourth segment signal that is after the second segment signal and continuous with the second segment signal; and based on the second segment signal, the third segment signal and the fourth segment signal, generate a signal band containing the starting point of the signal.

18. The device of claim 13, wherein to calculate, based on the measured energy value at each sampling point in the signal band, the instantaneous energy value at each sampling point in the signal band by using the sliding window, the processor is further to:

in the signal band, acquire a target sampling-point set containing at least two sampling points based on a target sampling point, wherein the target sampling point is any sampling point in the signal band; and calculate an average value of the measured energy values at all sampling points in the target sampling-point set, and determining the average value as the instantaneous energy value at the target sampling point.

19. The device of claim 18, wherein to acquire, in the signal band, the target sampling-point set containing at least two sampling points based on the target sampling point, the processor is further to:

in the signal band, assign the target sampling point as a starting point, acquiring the sampling point whose sampling time is prior to that at the target sampling point, and generating a first sampling-point set meeting a first number;

in the signal band, assign the target sampling point as the starting point, acquiring the sampling point whose sampling time is later than that of the target sampling point, and generating a second sampling-point set meeting a second number; and based on the target sampling point, the first sampling-point set and the second sampling-point set, generate the target sampling-point set.

\* \* \* \* \*